United States Patent [19]

Palilla et al.

[11] 4,374,819

[45] Feb. 22, 1983

[54] CATALYTIC PROCESS FOR REMOVING TOXIC GASES FROM GAS STREAMS

[75] Inventors: Frank C. Palilla, Framingham; Gary G. Gaudet, Dorchester; Joseph A. Baglio, Andover, all of Mass.

[73] Assignee: GTE Laboratories Incorporated, Waltham, Mass.

[21] Appl. No.: 218,845

[22] Filed: Dec. 22, 1980

Related U.S. Application Data

[60] Division of Ser. No. 93,662, Nov. 13, 1979, abandoned, which is a continuation-in-part of Ser. No. 715, Jan. 3, 1979, abandoned, which is a continuation of Ser. No. 864,692, Dec. 27, 1977, abandoned.

[51] Int. Cl.$^3$ .............................................. C01B 17/04
[52] U.S. Cl. .................. 423/570; 423/574 R; 252/462
[58] Field of Search .................... 423/570, 574, 576

[56] References Cited

U.S. PATENT DOCUMENTS

| | | | |
|---|---|---|---|
| 2,431,236 | 11/1947 | Fleming et al. | 423/570 |
| 3,199,955 | 8/1965 | West et al. | 423/570 |
| 3,717,699 | 2/1973 | Nicklin et al. | 423/526 |
| 3,931,390 | 1/1976 | Palilla et al. | 423/570 |
| 3,931,393 | 1/1976 | Palilla | 423/570 |
| 3,978,004 | 8/1976 | Daumas et al. | 423/576 X |

*Primary Examiner*—G. Peters
*Attorney, Agent, or Firm*—Barry Kramer

[57] ABSTRACT

A multi-stage process for reducing the content of sulfur-containing gases—notably hydrogen sulfide, sulfur dioxide, carbonyl sulfide and carbon disulfide—in waste gas streams is provided. In the first stage, the gas stream is passed through a reaction zone at a temperature between about 150° and 350° C. in the presence of a pretreated novel catalyst of the formula $$xLn_2O_3 \cdot yT_2O_3$$

in which Ln is yttrium or a rare earth element and T is cobalt, iron or nickel, and each of x and y is independently a number from 0 to 3, said catalyst being substantially non-crystalline and having a surface area of from about 10 m$^2$/g to about 40 m$^2$/g. The preferred catalyst is one in which Ln is lanthanum, T is cobalt, and x and y range from 1 to 3, including non-integers. The first stage yields a product stream having a reduced content of sulfur-containing gases, including specifically, substantial reduction of carbonyl sulfide and virtual elimination of carbon disulfide. An intermediate stage is a Claus reaction, which may take place in one or more reaction zones, at temperatures less than about 130° C., in the presence of known catalysts such as bauxite, alumina or cobalt molybdates. The final stage is the air oxidation of hydrogen sulfide at a temperature between about 150° and 300° C. in the presence of a catalyst usable in the first stage.

24 Claims, 8 Drawing Figures

CATALYTIC PROCESS FOR REMOVING TOXIC GASES FROM GAS STREAMS

CROSS-REFERENCE TO RELATED APPLICATIONS

This is a division, of application Ser. No. 93,662, filed Nov. 13, 1979 now abandoned which is a continuation-in-part of our application Ser. No. 000,715, filed on Jan. 3, 1979, which is a continuation of application Ser. No. 864,692 filed on Dec. 27, 1977, both now abandoned.

FIELD OF THE INVENTION

This invention relates in its principal aspect, to the removal of sulfur-containing gases from waste gas streams. More particularly, the invention relates to a multi-stage process for the removal of hydrogen sulfide, sulfur dioxide, carbonyl sulfide and carbon disulfide from gas streams containing these various compounds, such as flue or stack gases, gases resulting from oil or coal gasifications, smelter gases, etc. The first and final stages in this process require the use of particular yttrium or rare earth, notably lanthanum, catalysts and this invention relates, in a second aspect, to these catalytic materials and their method of preparation.

BACKGROUND OF THE INVENTION

The principal toxic sulfur-containing gases in waste gas streams are hydrogen sulfide ($H_2S$) and sulfur dioxide ($SO_2$). Present to a lesser extent—but also toxic—are carbonyl sulfide (COS) and carbon disulfide ($CS_2$).

The Claus process has long been utilized to remove hydrogen sulfide from gas streams by reacting hydrogen sulfide with sulfur dioxide in the presence of a catalyst, such as bauxite, alumina, cobalt molybdates, etc., to form sulfur and water. Alternatively, if the $CO_2$ content of the gas stream is low and the $H_2S$ content is high, one partially burns the $H_2S$ in air to form sulfur, water and $SO_2$. This is then followed by the $H_2S + SO_2$ reaction in a subsequent process stage. The $H_2S$ may be present in concentrations ranging from a few parts per million up to about 80 percent, depending upon the type of process or process stage from which the gases emanate. Processes which emit this pollutant include coal gasifiers, coal liquification plants, smelters, power plants, ore roasting units, and chemical manufacturing plants.

The Claus process has had three serious deficiencies. First, the process requires a "balancing" of the $H_2S$ and $SO_2$ to form the stoichiometric amounts of each required to balance the reaction, i.e., 2 parts of $H_2S$ to 1 part of $SO_2$. This balancing is accomplished by oxidizing part of the $H_2S$ to form $SO_2$. Secondly, several stages of catalyst are usually required to obtain the present substantial degree of reduction necessary via:

$$2H_2S + SO_2 \rightarrow 2H_2O + 3/2 S_2$$

in order to meet pollution standards. Thirdly, the presence of excessive amounts of oxygen deactivates most of the catalysts suggested for use in this process, thereby destroying the commercial feasibility thereof.

Therefore, from a conceptual point of view, an inherently better process would be one in which the oxygen is used to oxidize the $H_2S$ directly to elemental sulfur without having to generate additional $SO_2$. Although this catalytic oxidation of $H_2S$ to elemental sulfur is known [See, for example, Sreeramamurthy et al., *Journal of Catalysis* 37, 287-296(1975)], there are no catalysts, to the best of our knowledge, which are commercially utilized to oxidize $H_2S$ by the direct use of oxygen (principally because the catalysts are deactivated in the presence of oxygen). It would, therefore, be desirable to have a process for the catalytic oxidation by oxygen of $H_2S$ to elemental sulfur using a catalyst which is not deactivated by oxygen.

In view of increasingly stringent requirements on removal of toxic sulfur compounds in gas streams, there also exists a need for the development of catalytic processes which would reduce the concentrations of COS and $CS_2$ as well as $H_2S$ and $SO_2$, to acceptable limits. During the course of the $H_2S + SO_2$ reaction shown above, low molecular weight hydrocarbons, when present in the gas stream, react with the sulfur components and lead to the formation of COS and $CS_2$. In addition, the gas station may already contain small amounts of COS and $CS_2$ and these noxious compounds are not removed during the course of the Claus reaction using ordinary catalysts operating at low temperatures.

It is, therefore, a primary object of this invention to provide a novel process for the removal of hydrogen sulfide from gas streams containing hydrogen sulfide.

Another primary object of this invention is to provide a novel process for the simultaneous removal of both sulfur dioxide and hydrogen sulfide from gaseous waste streams.

A further primary object of this invention is to provide a novel process for the removal of carbonyl sulfide and carbon disulfide in conjunction with the removal of hydrogen sulfide from gas streams containing hydrogen sulfide.

It is another object of this invention to provide a process for the concomitant oxidation of hydrogen sulfide and reduction of sulfur dioxide using specific catalytic compositions which are not subject to poisoning by oxygen or water, and are less subject to the aforementioned deficiencies.

It is further additional object of this invention to provide a process for the catalytic reaction of hydrogen sulfide or carbonyl sulfide and sulfur dioxide to form elemental sulfur using specific catalytic materials which are not subject to poisoning by oxygen.

Yet a still further object of this invention is to provide novel catalytic compositions suitable for removal of toxic sulfur gases from gas streams.

And another object of this invention is to provide novel catalytic compositions suitable for use in the processes of this invention.

These and still further objects, advantages and features of the present invention will become apparent upon consideration of the following disclosure.

SUMMARY OF THE INVENTION

These and other objects are met by the present invention which provides a multi-stage process for removing noxious sulfur-containing gases—notably, hydrogen sulfide, sulfur dioxide, carbonyl sulfide and carbon disulfide—from waste gas streams. It employs the well known Claus reaction $$2H_2S + SO_2 \rightarrow 2H_2O + 3/2 S_2$$

and the usual Claus reaction catalysts, namely bauxite, alumina, cobalt molybdates, etc. The first stage also involves a Claus reaction, but it employs a novel catalyst which, in addition to catalyzing the Claus reaction, also permits the substantial reduction and/or elimination of carbonyl sulfide and carbon disulfide from the gas stream. The first stage comprises passing the gas stream through a reaction zone at a temperature of between about 150° and 390° C., preferably between 150° C. and 350° C., in the presence of a catalyst of the formula $$xLn_2O_3 \cdot yT_2O_3$$

in which Ln is yttrium or a rare earth element, T is cobalt, iron or nickel, and each of x and y independently is a number from 0 to 3. (It is understood, of course, that x and y cannot both be 0). Preferably, Ln is lanthanum, T is cobalt and each of x and y is a number ranging from 1 to 3, including non-integers. The catalyst is characterized by being substantially non-crystalline, having been prepared at a temperature no higher than 700° C., and having a surface area ranging from about 10 m$^2$/g to about 40 m$^2$/g. An intermediate stage comprises one or more Claus reactions, using ordinary Claus catalysts, as described above. A third, final, stage is required in order to bring down the concentration of hydrogen sulfide to less than 10 ppm. The reaction in this final stage is the air oxidation of hydrogen sulfide in the presence of a catalyst of the type used in the first stage. In both the first and the final stages, the catalyst is pretreated by (a) exposure to an initial or succeeding feed stream (e.g. feed to the first stage, a second stage or the final stage), (b) exposure to H$_2$S, H$_2$, CO or a combination of these gases, or (c) both (a) and (b). As used herein, the term "pretreated catalysts" refers to the above-described catalyst pretreated in this manner.

Figure 1:
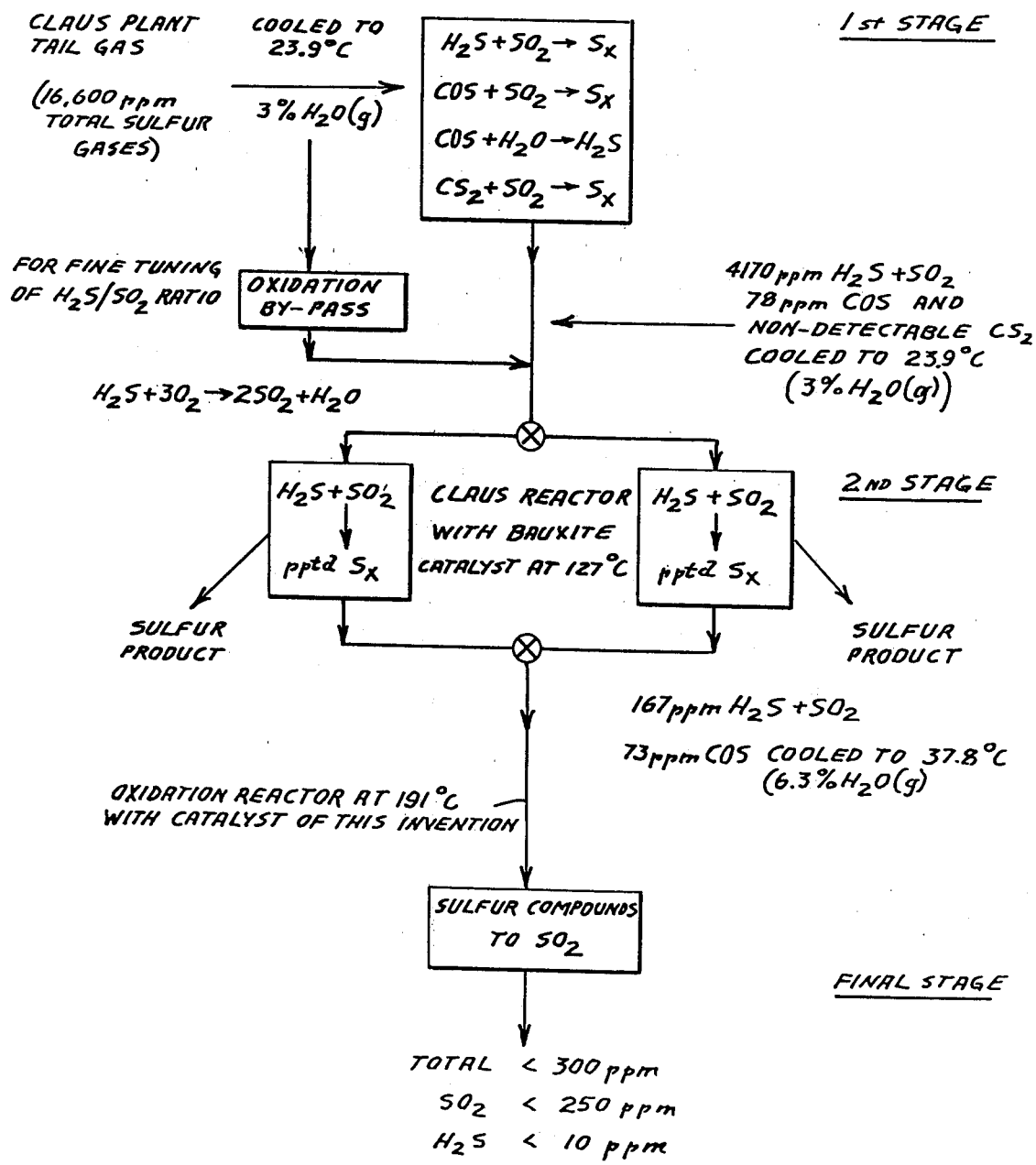
FIG. 1 is a flow chart exemplifying the process of this invention.

Further description of these drawings will be found in the Detailed Disclosure and Examples.

DETAILED DISCLOSURE

The first stage in the process of this invention will, in a typical waste gas stream, convert about 60% of the H$_2$S to sulfur and reduce the concentrations of COS and CS$_2$ to acceptable levels.

The choice of a proper catalyst for this first stage is a critical factor in the process of this invention. The gas composition of a typical tail gas consists of about 17,000 ppm of sulfur gases, mixed with H$_2$, CO, moisture, CO$_2$ and N$_2$. The sulfur gases are mostly H$_2$S and SO$_2$, plus a small amount (1000 ppm) of COS and CS$_2$. These latter two constitute about 7 percent of the total sulfur components. If the catalyst is an ordinarily efficient Claus reaction catalyst, equilibrium concentrations will be met and the effluent from the first stage would contain COS and CS$_2$ in amounts of only about 1.5 percent of the total sulfur content of the stream. However, these components are normally unchanged in any subsequent, low temperature, commercially available bauxite stage of the process described herein; these later stages are effective only for the H$_2$S+SO$_2$ conversion to sulfur. Therefore, this amount of COS+CS$_2$ would now represent a very large percentage (about 33%) of the total sulfur pollutants, and this amount is essentially the same as that leaving the third, air-oxidation stage. It is, therefore, absolutely essential that the first stage catalyst provide for COS and CS$_2$ conversion, and this must be done at temperatures no higher than 350° to be economically useful.

In order to meet this objective, therefore, there are three requirements for the first stage catalyst. It must effect the conversion of COS and CS$_2$ to extremely low levels. In the presence of the usual components of the first stage gas stream, the conversion of COS to S$_x$ is thermodynamically controlled and hence inversely related to temperature. Lower temperatures, therefore, result in higher conversions. The conversion of CS$_2$, on the other hand, is kinetically controlled (relative to COS in the range of interest), and hence is favored by higher temperatures. A first stage catalyst which functions effectively in removing CS$_2$ at temperatures below 350° C. offers distinct advantages over other catalysts. The levels of H$_2$S and SO$_2$ are normally still too high at this point (in excess of 4000 ppm), and subsequent processing is necessary to reduce their final concentrations to acceptable levels. The only technology available today to accomplish this total task is the use of scrubbers as a final step following several catalytic stages. Associated with this scrubber technology, however, are problems in corrosion, regeneration and/or disposal.

This invention provides a process for the catalytic removal of hydrogen sulfide from concentrations of about 20 percent to below 10 ppm in the gas stream. The H$_2$S is converted to elemental sulfur using a minimum number of catalytic stages and avoiding the use of scrubbers. The process also reduces COS and CS$_2$ from levels of about 1000 ppm each, to levels of less than 100 ppm and 10 ppm, respectively, by catalytically converting, at suitable low temperatures (less than about 350° C.), these components of the gas to elemental sulfur by reaction with SO$_2$. The process also reduces the hydrogen sulfide concentration by its oxidation to SO$_2$ and/or S$_x$ in a catalytic reaction of H$_2$S with oxygen over the catalytic materials defined herein.

The H$_2$S, COS, CS$_2$ and SO$_2$ in a tail gas containing, for example, levels of about 1 percent H$_2$S, and 1000 ppm COS and CS$_2$ are reduced to environmentally acceptable limits of less than 300 ppm total sulfur gases in which H$_2$S is less than 10 ppm and the SO$_2$ is less than 250 ppm. This is accomplished even in the presence of reductants such as CO and H$_2$ and in the presence of H$_2$O and CO$_2$.

The process is essentially a three-stage process, in which the first stage involves the reactions:

$$2H_2S + SO_2 \rightarrow 3/nS_n + 2H_2O;$$

$$2COS + SO_2 \rightarrow 3/nS_n + CO_2$$

and/or $$COS + H_2O \rightarrow H_2S + CO_2;$$

$$CS_2 + SO_2 \rightarrow 3/nS_n + CO_2 \text{ and/or}$$

$$CS_2 + 2H_2O \rightarrow 2H_2S + CO_2.$$

The intermediate stage, which may be run in one or more reaction chambers involves the reaction:

$$2H_2S + SO_2 \rightarrow 3/nS_n + 2H_2O.$$

The final stage converts the residual $H_2S$ to $S_x$ or $SO_2$ by the reactions:

$$2H_2S + O_2 \rightarrow 3/nS_n + 2H_2O$$

and/or $$2H_2S + 3O_2 \rightarrow 2SO_2 + 2H_2O$$

without the concomitant formation of $SO_3$. The first stage reaction chamber is operated at temperatures from about 150° to about 350° C. The intermediate stage reaction is run at temperatures below about 130° C., and at gas hourly space velocities of about 2000 or less. The final stage reaction chamber is operated at temperatures from about 150° to about 300° C., preferably about 200° C. These reactions are carried out at space velocities as high as 60,000 v/v/hr with rates between 1,000 and 10,000 v/v/hr being preferred.

While there are Claus catalysts available to perform the first and final stage reactions, these have been found to be feasible only at temperatures higher than those operable with and/or at space velocities much lower than those permitted by our catalysts. The higher temperatures associated with the known Claus catalysts (greater than 350° C.) such as bauxite, alumina, promoted analogues, etc., result in increased $H_2S$ concentrations, and involve higher operating costs. Moreover, many of the known catalysts are subject to deactivation after short periods of operation, especially in the presence of traces of oxygen as found in first stage conditions.

The typical Claus catalyst heretofore known also present serious problems as regards conversion of COS and $CS_2$. For example, at 1000 ghsv, it is not possible to achieve complete $CS_2$ conversion at 270° C. even with fresh catalysts, although excellent conversion of COS is achieved under these conditions. These problems are discussed in more detail in a paper by J. Pearson, "Recent Developments in Claus Catalysts", published in Gas Processing/Canada, May-June 1973, pertinent portions of which are incorporated herein by reference. By comparing the activities of active alumina and bauxite, Pearson concluded that there is a major sulfur recovery advantage in operating a first converter at the minimum temperature at which satisfactory $COS/CS_2$ conversion can be achieved (above the sulfur dewpoint, of course). For example, with the gas stream indicated for $H_2S$ conversion, there was obtained 14 percent conversion at 390° C., 25 percent at 375° C., and 50 percent at 350° C. The data show further that at 375° C., 69 percent $CS_2$ conversion was obtained with bauxite and 90 percent with active alumina. While higher conversion can be obtained with bauxite at higher temperatures, this would have resulted in lower sulfur recovery from $H_2S/SO_2$ reaction due to equilibrium effects.

Pearson indicates that a number of catalysts exist for the conversion of COS and $CS_2$, as well as for $H_2S$ and $SO_2$ to sulfur, as long as the reaction temperature is above 375° C. Furthermore, Whelan et al. in U.S. Pat. Nos. 3,926,854, 3,947,380 and 4,062,932 describe a number of perovskite-structured compositions which can be used in various oxidation-reduction reactions including the Claus reaction. However, as will be shown below, the Whelan et al. catalysts, prepared according to their teachings, do not show any advantage over the previously known catalysts summarized by Pearson. A further indication that the perovskite materials are not suitable for low temperature oxidation-reduction reactions of gaseous sulfur compounds is given in a thesis by J. G. I. Bazes, "Catalytic Reduction of Sulfur Dioxide with Carbon Monoxide", University of California, Los Angeles (1972), and in Palilla U.S. Pat. No. 3,931,393. In these, various rare earth cobalt oxides ($RECoO_3$) were prepared as perovskites by high temperature reaction (1000° C. and higher) and the powder was then evaluated as such (neat material) or was physically mixed with high surface area supports to form a perovskite of flow surface area on a high surface area medium. The high BET surface areas measured for the supported catalysts, therefore, represent mainly the surface area of the supports. Despite this high surface area, both investigators showed conversions, at temperatures below about 500° C., which are considerably lower than those attainable by the use of the catalysts of this invention.

The catalysts of the present invention have been tailored to perform the necessary conversions at economically suitable temperatures and exhibit sufficient life and/or regenerability to make these specific compositions commercially useful. It is to be emphasized that these tailored compositions differ in crystal structure and/or composition from all those previously known. Furthermore, a pretreatment of the catalyst is necessary to specifically tailor these materials to those species active in promoting the catalytic processes of interest.

Generally, transition metal oxides such as cobalt, iron and nickel—particularly cobalt—are well known oxidation-reduction catalysts. Yttrium and rare earth oxides, particularly the oxides of lanthanum, are known for their acid-base properties. We have specifically tailored compositions which combine the basic properties of the yttrium/rare earth (notably, lanthanum) oxides, oxysulfides, oxycarbonates, sulfides, etc. with the oxidation-reduction capabilities of the transition metal oxides and sulfides to form catalysts which are especially suitable for Claus-type reactions between $SO_2$ and $H_2S$, COS and $CS_2$, as well as for oxidation of $H_2S$ by oxygen. The preparation of these catalysts was designed to avoid the formation of perovskite structures since these crystalline structures would alter the acid-base and oxidation-reduction behavior of the catalysts.

The catalysts of this invention are described by the general formula $$xLn_2O_3 \cdot yT_2O_3$$

in which Ln is yttrium or a rare earth element, T is a transition element selected from the group consisting of cobalt, iron and nickel, and each of x and y is a number ranging from 0 to 3 (including non-integers). Both x and y cannot simultaneously be 0. Preferably Ln is lanthanum, T is cobalt and each of x and y ranges from 1 to 3, including non-integers. The following discussion of these catalysts speaks mainly of lanthanum and cobalt, but it is to be understood that these preferred elements are merely exemplary of the elements set forth above in the definitions of Ln and T.

The unsupported (neat) materials of these formulations can be regarded as mixed phases of lanthanum and cobalt oxygen-based compounds such as $La_2O_3$, La- (OH)$_3$, La$_2$O$_2$CO$_3$ Co$_3$O$_4$, CoO, etc. The neat materials are normally prepared by low temperature decomposition (less than about 700° C. and preferably about 350° C.) of mixed salts such as the nitrates, oxalates or acetates of lanthanum and cobalt; but it is within the scope of this invention to prepare the lanthanum and cobalt products individually and then subsequently to mix them, if so desired. It is important, however, that the maximum temperature limitation of about 700° C. be observed, because if it is substantially exceeded, one will obtain crystalline materials of perovskite structure which will not be suitable for use in the process of this invention.

The above neat materials may be evaluated directly as the powders but they are normally prepared for evaluation by pelletizing the composite through the method of dry pressing with a binder, which is subsequently volatilized, or by slip-casting. If necessary, the pellets are fractionated to about $-10/+30$ mesh to minimize channeling through the reaction chamber while avoiding excessive pressure drops.

In the preparation of supported catalysts, two preferred methods are used: either (a) mixing the catalyst powders with up to 50 volume percent powders of support materials such as zirconia, alumina or magnesia, and evaluating the mixed powders as such or, more usually, after pelletizing these composites as described for the neat catalysts; or (b) solution impregnation of support pellets of zirconia, magnesia or alumina by appropriate solutions of salts of lanthanum and/or cobalt, such as the nitrates or acetates, followed by low temperature (less than 500° C.) calcination to generate the catalyst composition in situ. In either case, special care must be taken to prevent the formation of perovskites and/or spinels such as LaAlO$_3$ or CoAl$_2$O$_4$.

The surface areas of the neat catalysts prepared as above generally are in the range of from about 10 m$^2$/g to about 40 m$^2$/g, with 20 to 35 m$^2$/g being most typical. The supported materials range in surface area from about 20 m$^2$/g up to about 300 m$^2$/g.

The pretreated catalysts used in the process of this invention include derivatives of the above-described materials resulting from (a) exposure to the initial or succeeding feed streams (for example in the first stage, a second stage or the final stage catalytic converter), (b) low temperature pretreatment of the material with H$_2$S, H$_2$, CO, or a combination of these gases, and (c) pretreatment as in (b) followed by exposure to one of the feed streams. Identified derivatives include CoS$_x$ (such as Co$_3$S$_4$ and Co$_9$S$_8$), La$_2$O$_2$S$_x$ (such as La$_2$O$_2$S and La$_2$O$_2$S$_2$), 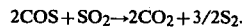La$_2$O$_2$SO$_4$ and La carbonates; principally CoS$_2$, La$_2$O$_2$CO$_3$, La$_2$O$_2$S, as well as the oxides. These derivatives can be added as mixtures of such materials, such as, for example a mixture of CoS$_2$ and La$_2$O$_2$S, or as a preformed material represented by the formula $x$La$_2$O$_3$·$y$Co$_2$O$_3$ with $x$ and $y$ as defined above.

A multiple reaction chamber system is contemplated in the practice of this invention and it has been found possible and desirable to provide each reaction chamber with the particular catalyst found to be best suited to the principal reaction occurring therein. Thus, each chamber in the system may have, if desired, a different catalyst. For example, it has been found that La$_2$O$_2$S is particularly effective as a catalyst in the reaction:

$$2COS + SO_2 \rightarrow 2CO_2 + 3/2S_2.$$

Where there are significant amounts of COS in the initial gas stream or where COS is formed as a by-product in a primary reaction, there can be provided a special reaction chamber containing La$_2$O$_2$S for the purpose of eliminating the COS. When there is a substantial amount of water vapor present, as in the reactions plotted in FIGS. 2 and 3, the efficiency of COS conversion decreases with increasing temperatures; hence, in this situation the usual low temperatures of this invention (below about 350° C.) are preferred. However, when there is no water vapor present, the reaction between COS and SO$_2$ increases in efficiency with increasing temperature; here temperatures of 400° C. to 450° C. or even up to about 700° C. are preferred.

In a broad aspect, the process of the present invention is directed to the removal of hydrogen sulfide from any hydrogen sulfide-containing gas stream where a catalyst of the above-identified general formula is charged to the catalytic reactor(s) and an oxidizing gas, such as sulfur dioxide and/or oxygen, is added to, or present in sufficient quantities in, the hydrogen sulfide-containing gas stream to within about ±15 percent, generally about ±10 percent, of the stoichiometric amount required for complete oxidation of all hydrogen sulfide (and any other oxidizable sulfur-containing materials) to elemental sulfur and/or to sulfur dioxide. If the amount of reducing or oxidizing gas in the stream is sufficient, no further amount need be added thereto. However, quantities of the needed gas can be added, or generated in situ, as necessary, to provide the desired relative amount of reductants and oxidants in the gas stream.

The process of this invention can be described with reference to the flow chart shown in FIG. 1. This chart gives some specific experimental conditions which are illustrated in the examples below, but the overall objectives can be explained in more general terms with reference thereto.

The first primary objective is to remove the H$_2$S present in a gas stream in concentrations from about 1 to about 20 percent by reaction with SO$_2$. FIG. 1 illustrates the case where H$_2$S is present at the 1 percent level (10,000 ppm) and which also contains an amount of SO$_2$ (5600 ppm) sufficient to react with the H$_2$S, COS (800 ppm) and CS$_2$ (200 ppm) to form elemental S$_x$. At the moisture levels illustrated (3% H$_2$O(g)), the first stage is sufficient to reduce the total of H$_2$S + SO$_2$ to amounts less than 6900 ppm; this is sufficiently low so that further conversions in the next stage (greater than 96% conversion) are adequate to yield an effluent containing less than 300 ppm of total sulfur; this amount is easily processed in a third air-oxidation stage to meet current regulatory requirements in the United States. It is to be noted that the second stage normally consists of two parallel chambers containing commercially available catalyst grade bauxite alumina available, for example, from Engelhard Minerals and Chemicals Corporation, Murray Hill, New Jersey. The temperatures in this stage are low enough to precipitate out the sulfur formed and thereby shift the equilibrium to yield the high conversions of H$_2$S + SO$_2$ to S$_x$. In operation, one chamber is functioning alternately while the second is being regenerated by volatilization of the S$_x$ deposited. Under other initial conditions, such as higher H$_2$S and H$_2$O(g) concentrations, it may be necessary to pass the gas stream through more than one reaction zone in the second stage. Included in the first primary objective, the CS$_2$ and COS in the initial feed stream are concomitantly reduced in the first stage to near thermodynamic levels, usually less than 10 ppm for $CS_2$ and less than 100 ppm COS.

It must be stressed that the reduction in concentration of COS and $CS_2$ in the first stage is especially crucial, even though they are present in only small amounts, because little or no further conversion of these components occurs in the intermediate low temperature stages where bauxite or alumina catalysts are used. This is particularly important for $CS_2$.

The catalysts of this invention are excellent catalysts for the Claus reaction and can, if desired, be employed in the intermediate stage of our process. However, it is not necessary to do so and economic considerations will generally make it advisable for the intermediate stages to employ the Claus catalysts ordinarily in use, such as bauxite, alumina, etc.

The second primary objective is the oxidation of $H_2S$ to elemental $S_x$ or $SO_2$ by reaction with oxygen. If the resultant $SO_2$ concentration is low enough, the effluent can be discharged to the atmosphere as illustrated in the final stage of FIG. 1. If instead, the resultant $SO_2$ concentration is above permissible emission levels, the effluent can be returned to a previous stage, or conditions in the final stage reactor can be modified by lowering the oxygen concentration and/or changing the temperature so that the $H_2S$ is oxidized to $S_x$, instead of $SO_2$. The $S_x$ can be precipitated from the effluent.

A third primary objective is to utilize this air-oxidation process early in the Claus plant, for example, in place of, or immediately following, the combustion stage. In the former case, the lower temperature reactions will better avoid the formation of appreciable amounts of COS and $CS_2$. In either case, this third objective would minimize the present requirements at Claus plants for a combustion stage and a minimum of three catalytic stages, with a final scrubbing system.

The process of this invention is especially useful when the concentration of $H_2S$ in the waste gas stream to be treated in less than about 7%. The oxidation of waste gas streams having high concentrations (about 7-26%) of $H_2S$ is normally carried out prior to our first stage. The oxidation of high concentrations of $H_2S$ with $O_2$ can be carried out either catalytically at low temperatures (generally <300° C.), or thermally at high temperatures (generally >1000° C.). However, if carried out catalytically at low temperatures, the exothermicity of the reaction requires that the catalyst bed be cooled, for example by interstage cooling, or that the GHSV be maintained at a sufficiently low level to dissipate the heat generated. Since both requirements impose economic disadvantages on the low temperature catalytic oxidation of high concentrations of $H_2S$, the process at these higher concentrations is usually conducted as a high temperature thermal oxidation. The optimum temperature is then the value ($\sim 1400°$ C.) equal to $\Delta T$ for the reaction, at which point the process is thermally self-supporting.

We have found that the catalyst of our invention is useful, at somewhat higher temperatures than can be employed in the process of our invention, for oxidizing these higher concentrations of $H_2S$. For this purpose reaction temperatures can range up to about 750° C., and a major portion of the $H_2S$—up to about 70% or more—is converted to sulfur. Thus, our catalyst can be used at this somewhat higher temperature in a "preliminary stage" reaction when the $H_2S$ content of the waste gas exceeds about 7%. The effluent of this "preliminary stage" is then treated by the process of this invention.

The following examples are given to enable those skilled in this art to understand more clearly and to practice the present invention. They should not be considered as limitations upon the scope of the invention, but merely as being illustrative and representative thereof.

In these examples, reactor systems which permit the synthesis of gas compositions simulating those found in typical process streams are utilized. Provision is made to introduce $N_2$, $CO_2$, CO, $H_2$, $O_2$, $SO_2$, $H_2S$, COS, and $CS_2$ in $N_2$ in varying amounts into a stainless steel manifold. From the manifold these gases pass through a—1" (2.5 cm) diameter, 18" (45.7 cm) long stainless steel tube, partly filled with $\frac{1}{4}$" (0.6 cm) diameter quartz balls, which serves as a mixing chamber, then to a water vapor injection zone consisting of Sage Model 341 syringe pumps having 10-50 ml. plastic syringes connected to the system via $\frac{1}{8}$" (0.3 cm) polyethylene lines. After the water injection zone, the gases flow through an inverted, heated, U-shaped glass tube which leads directly to the reactor, a $1\frac{1}{2}$" (3.8 cm) diameter 15" (38.1 cm) tube furnace surrounding a 1" (2.5 cm) diameter, 18" (45.7 cm) long quartz tube having fritted joints at both ends. The catalyst sits in the reactor 4" (10.2 cm) above the bottom of the furnace and is supported by a small amount of Fiberfrax wool. The amount of catalyst used depends on the process parameters of interest such as space velocity. The effluent is taken from the flask by syringe for analysis with a gas chromatograph. A 1" (2.5 cm) diameter reactor tube is normally used for volumes of catalyst beds of 10 ml. to 30 ml. in the form of pellets or $-10/+20$ mesh fractionated pieces. For the analysis of powders, or for faster space velocities, achieved by maintaining the absolute flow high but reducing the catalyst bed volume, a smaller diameter tube is used; for example, a tube with an inner diameter of about $\frac{1}{4}$" (0.6 cm) is especially useful. This smaller diameter tube was also used when neat catalysts were employed.

Unless otherwise indicated, this reactor system was used in all the catalytic reactions using the catalyst of this invention.

EXAMPLE I 33.68 g of lanthanum acetate $La(C_2H_3O_2)_3.nH_2O$ (assay 41.24% La) and 24.91 g of cobalt acetate Co $(C_2H_3O_2)_2.4H_2O$ were dry blended for 4 hours in a ball mill at room temperature, transferred to a porcelain crucible and dried at 150° C. for 4 hours. It was then placed in a furnace and the temperature raised to 200° C. and held there for 2 hours. The same was then fired at 350° C. for 4 hours. This formulation is equivalent to $x=y$ in $xLa_2O_3.yCo_2O_3$ although the material is poorly crystallized and the only distinct phases revealed by x-ray diffraction are $La_2O_2CO_3$ and CoO.

EXAMPLE II

The procedure of Example I is repeated using 33.68 g of the lanthanum acetate and 25.41 g of cobalt acetate to prepare the equivalent of $La_2O_3.1.02Co_2O_3$.

EXAMPLE III

The procedure of Example I is repeated using 33.68 g of the lanthanum acetate and 49.82 g of cobalt acetate to prepare the equivalent of $La_2O_3.2Co_2O_3$.

EXAMPLE IV

The procedure of Example I was repeated using 16.84 g of La($C_2H_3O_2$)$_3$.n$H_2O$ (assay 41.24% La) and 37.365 g Co($C_2H_3O_2$)$_2$.4$H_2O$ to prepare the equivalent of La$_2O_3$.3Co$_2O_3$.

EXAMPLE V

The procedure of Example I was repeated using 33.68 g of lanthanum acetate to prepare the equivalent of 1La$_2O_3$.0Co$_2O_3$. The final product contained some La$_2O_2CO_3$ as well as La$_2O_3$. The surface area of the product was 30 m$^2$/g.

EXAMPLE VI

The procedure of Example I was repeated using 33.68 g of the lanthanum acetate and 12.455 g of the cobalt acetate to prepare the equivalent of 2La$_2O_3$.Co$_2O_3$. Here the x-ray patterns reveal La$_2O_3$ in addition to the La$_2O_2CO_3$ and CoO.

EXAMPLE VII

The procedure of Example I was repeated using 50.52 g of the lanthanum acetate and 12.455 g of the cobalt acetate to prepare the equivalent of 3La$_2O_3$.Co$_2O_3$. As in the previous example, the La$_2O_3$ is also revealed by x-ray diffraction.

EXAMPLE VIII

The procedure of Example I was repeated using 24.91 g of the cobalt acetate to prepare the equivalent of 0La$_2O_3$.1Co$_2O_3$.

EXAMPLE IX 1450 g of La($C_2H_3O_2$)$_3$.1.5$H_2O$ (40.49% assay as La) was blended with 1076.1 g of Co($C_2H_3O_2$)$_2$.4$H_2O$ in a Vee blender, dried overnight in trays at 115° C., ball milled for 2.5 hours, fired in an exhaust circulating oven in stainless steel trays at 200° C. for 16 hours, cooled and ball milled once again for 2.5 hours, returned to the oven and the temperature raised to 350° C. at the rate of 0.5° C./min. The charge is then maintained at 350° C. for 1 hour, cooled and sieved through a 50 mesh sieve to prepare the equivalent of La$_2O_3$.1.02Co$_2O_3$.

Portions of the above product were pelletized by blending 30 ml of 6% Elvacite-2045 (a low molecular weight copolymer of methyl methacrylate and n-butyl methacrylate available from E. I. duPont de Nemours & Co., Wilmington, Del.) in toluene for each 100 g of catalyst powder, then drying the paste for 4 hrs at 120° C., taking the beaded fraction which passes a 40 mesh sieve but does not pass a 140 mesh sieve, blending in 2% stearic acid, pelletizing this portion of ⅛″ (0.3 cm) diameter × ⅛″ (0.3 cm) high pellets in a Stokes press, and then calcining the pellets so formed at 550° C. for 15 minutes to volatize organic matter. These pellets can be used as such or they may be gently ground by mortar and pestle and suitably fractionated by classification with sieves into portions appropriate to the catalyst bed volumes to be used in the reactor system in which the catalyst is to be evaluated.

EXAMPLE X

A sample prepared according to our Example IX was used in the first and final stges of the three-stage system for tail gas desulfurization. The process requirements are shown in Table 1, and the multi-stage process design system is shown schematically in FIG. 1.

TABLE 1

Tail Gas Desulfurization

| Tail Gas Composition (input to first stage) | Process Parameters |
|---|---|
| 1% $H_2S$ | Temperatures 127° C.–328° C. |
| 0.50% $SO_2$ + 0.06% ($SO_2$ and/or $O_2$)oxidant | Pressures 1–1.2 atm |
| 0.08% COS | GHSV ~ 2000 v/v/hr |
| 0.02% $CS_2$ | |
| 0.15% CO | |
| 0.5% $H_2$ | |
| 20.0% $CO_2$ | |
| 2.9–6.3% $H_2O$(g) | |
| Balance = $N_2$ | |

EPA Specifications For The Total Process Effluent September 1976

Total sulfur gases < 300 ppm
in which $SO_2$ < 250 ppm and
$H_2S$ < 10 ppm

After sulfiding 16–17 cc of −10/+20 mesh of the La$_2O_3$.1.02Co$_2O_3$ catalyst at 350° C. overnight with 0.56% $SO_2$ in the gas stream, the temperature was reduced to 328° C. After 5 days of operation, the exit stream from the first reactor contained 3000 ppm $H_2S$, 1170 ppm of $SO_2$, 78 ppm COS and a non-detectable (ND) level of $CS_2$ (<few ppm). Table 2 contains these data as well as data showing the results of using the same catalyst in this first stage reactor under somewhat varying conditions.

TABLE 2

Feed: Nominally 1.0% $H_2S$, 0.50% $SO_2$, 0.08% COS, 0.02% $CS_2$, 0.15% CO, 0.5% $H_2$, 3.0% $H_2O$(g), 20.0% $CO_2$, balance = $N_2$
ghsv = 2000 v/v/hr

| Days in Oxidation | Oxidant (ppm) | Temp. °C. | $H_2S$ | COS | $CS_2$ | $SO_2$ | $H_2S/SO_2$ | Overall Conversion to S (%) based on 1.6% S Feed |
|---|---|---|---|---|---|---|---|---|
| With one portion of −10/+20 mesh catalyst of Example IX sulfided at 350° C. with 0.56% $SO_2$ in feed: ||||||||||
| 5 | 5600 $SO_2$ (i.e. with $SO_2$ alone as oxidant) | 328 | 3000 | 78 | ND | 1170 | 2.6 | 73 |
| 7 | 5000 $SO_2$ 600 $O_2$ | 320 | 3312 | 78 | NM | 789 | 4.3 | 74 |
| 12 | 5000 $SO_2$ 600 $O_2$ | 330 | 3700 | 84 | NM | 1058 | 3.6 | 70 |
| With a second portion of −10/+20 mesh catalyst of Example IX sulfided at 350° C. with 0.5% $SO_2$ and 1280 ppm $O_2$. ||||||||||
| 1 | 5000 $SO_2$ 1280 $O_2$ | 320 | 2776 | 64 | ND | 1274 | 2.2 | 74 |

TABLE 2-continued

Feed: Nominally 1.0% $H_2S$, 0.50% $SO_2$, 0.08% COS, 0.02% $CS_2$, 0.15% CO, 0.5% $H_2$, 3.0% $H_2O(g)$, 20.0% $CO_2$, balance = $N_2$
ghsv = 2000 v/v/hr

| Days in Oxidation | Oxidant (ppm) | Temp. °C. | $H_2S$ | COS | $CS_2$ | $SO_2$ | $H_2S/SO_2$ | Overall Conversion to S (%) based on 1.6% S Feed |
|---|---|---|---|---|---|---|---|---|
| 2 | 5000 $SO_2$ 1280 $O_2$ | 320 | 3332 | 73 | 10 | 1510 | 2.2 | 69 |
| 3 | 5000 $SO_2$ 1380 $O_2$ | 330 | 3720 | 81 | NM | 1730 | 2.2 | 65 |
| 4 | 5000 $SO_2$ 1630 $O_2$ | 333 | 3912 | 86 | NM | 1702 | 2.3 | 64 |

ND = Not detected
NM—Not measurable (<5 ppm)

Fine tuning the exit stream with an oxidation by-pass of a portion of the feed stream adjusts the $H_2S/SO_2$ ratio to 2/1 into the second stage (i.e. 3000 ppm $H_2S$ + 1500 ppm $SO_2$), and assuming a 96% conversion in the second stage containing bauxite (a conservative estimate according to the Pearson article discussed above), the effluent should contain less than about 180 ppm of $H_2S + SO_2$, 78 ppm of COS and a non-detectable amount of $CS_2$.

Feeding this stream into the third (oxidation) stage containing the $La_2O_3 \cdot 1.02Co_2O_3$ catalyst yields a product stream which meets current environmental specifications. This condition was simulated in an experiment designed to determine the process parameters. The catalyst in this stage is the same catalyst as that used in the first stage.

The gas stream had the following constituents: 100 ppm $H_2S$, 80 ppm COS, 10 ppm $CS_2$, 50 ppm $SO_2$, 0 to 3500 ppm $O_2$, 0.15% CO, 0.5% $H_2$, 20.0% $CO_2$, 7% $H_2O(g)$, balance=$N_2$. (The $CS_2$ is included here as a "worst case" situation since it would be expected to be absent after the first stage. This simulated stream also represents the maxima to be expected for the remaining sulfur components). Process conditions are shown in Table 3.

TABLE 3

| Process Parameters: | ghsv = 2000-4000 v/v/hr Temperature = 191°-233° C. | | | | | |
|---|---|---|---|---|---|---|
| ND = Not Detectable; Activation: | NM = Not Measurable (<10 ppm) Exposed overnight to full stream with oxygen present in stoichiometric amount (300 ppm) for the sulfur reductants, at 250° C. and 4000 v/v/hr. | | | | | |
| Temp. °C. | Days in + Operation | Oxygen Added (ppm) | COS | $H_2S$ | $CS_2$ | $SO_2$ |
| 194 | 0 (Initial) | 300 | 84 | ND | 9.4 | 102 |
| 195 | 0+ | 999 | 71 | ND | 9.0 | 144 |
| 193 | 1 | 999 | 80 | ND | 9.0 | 111 |
| with $O_2$ increased overnight to just shy of stoichiometry (3550 ppm) for all reductants: | | | | | | |
| 191 | 2 | 3500 | 81 | ND | 10.4 | 138 |
| after overnight at 232° C. | | | | | | |
| 232 | 3 | 3500 | 55 | ND-NM | 9.7 | 150 |
| and at ghsv of 2100 and $H_2O(g)$ reduced to 6.0%: | | | | | | |
| 232 | 3+ | 3500 | 38 | ND | 8.6 | 142 |

+ - following overnight activation

These data show that current specifications of the United States Environmental Protection Agency are met. Elimination of COS entirely would require adjustment of process parameters; i.e., higher temperature or lower space velocity in the third stage to enhance the

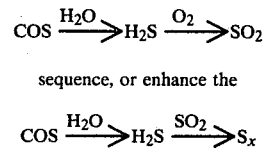

sequence, or enhance the $$COS \xrightarrow{H_2O} H_2S \xrightarrow{SO_2} S_x$$

sequence in the first stage by lower space velocity and/or higher $H_2O(g)$. The data also show that the oxidation can proceed partially to $S_x$ and partially to $SO_2$, depending on the oxygen addition and/or temperature, or the oxidation of $H_2S$ can be taken all the way to $SO_2$, in either case resulting in an effluent containing a non-detectable level of $H_2S$, i.e. less than 10 ppm.

Furthermore, as can be seen in Table 2, the first stage reactor was continued for an additional 8 days and a second portion of the catalyst was operated for 4 days. During this time, the oxidant was changed from 0.56% $SO_2$ to 0.50% $SO_2$ mixed with up to as much as 0.163% $O_2$. Even under these conditions, the effluent contained $H_2S$, $SO_2$, COS and $CS_2$ in concentrations which could be easily handled by subsequent passage through the second (low temperature Claus) and third (air-oxidation) stages of the process of this invention.

EXAMPLE XI

A sample prepared according to Example IX was used in a first stage simulation but the gas stream processed did not include COS or $CS_2$, i.e., 1% $H_2S$, 0.5% $SO_2$, 0.15% CO, 0.5% $H_2$, 20.0% $CO_2$, 1 to 6.2% $H_2O(g)$, balance=$N_2$. A 90.5%±1.0% conversion of $H_2S + SO_2$ to $S_x$ was maintained over a period of 103 days with 1–1.2% $H_2O(g)$ and a 77.0±1.5% conversion was maintained for an additional 41 days at 6.16% $H_2O(g)$. The gas-hourly space velocity (ghsv) over this period of time was maintained at between 1800-2000 v/v/hr. The temperature of operation was maintained between 225°-265° C. These results are somewhat better than those predicted by equilibrium calculations. This example illustrates the ability of our catalyst to perform effectively in catalyzing the $H_2S + SO_2$ conversion to sulfur over a long period of time without degradation.

EXAMPLE XII

The catalyst formulated as $La_2O_3 \cdot Co_2O_3$ in Example I was prepared by impregnation of −10/+20 mesh 3 $Al_2O_3 \cdot 2$ $SiO_2$ as a support using nitrated solutions of lanthanum and cobalt. Using the indicated feed stream of Table 4, conversions of 90-94% of the $H_2S + SO_2$ were attained under first stage conditions but without COS or $CS_2$ in the feed stream. No $CS_2$ and less than 30 ppm of COS was generated at moisture levels of 1.2% or less even after 19 days of operation.

TABLE 4
LIFE TEST ON ALUMINUM SILICATE SUPPORTED CATALYST

$La_2O_3 \cdot Co_2O_3$ by impregnation and calcining on $3Al_2O_3 \cdot 2SiO_2$
17 cc of $-10/+20$ mesh presulfided at 300° C.
Feed: As for neat catalysts, nominally 1.0% $H_2S$, 0.5% $SO_2$, 0.15% CO, 0.5% $H_2$, 0.0-1.2% $H_2O(g)$, 20.0% $CO_2$, balance = $N_2$.
ghsv: 2000 v/v/hr
Temperature: 248°-249° C.
Results in % conversion of ($H_2S + SO_2$) $1/x\ S_x$:
with 0.0% $H_2O(g)$:
   12th day of operation = 93.6 ± 0.1% with less than 30 ppm COS
with 1.2% $H_2O(g)$:
   19th day of operation = 98.7 ± 0.3% with less COS than after the 12th day.

EXAMPLE XIII

The catalyst of Example I was blended with MgO, pelletized as in Example IX, presulfided at 300° C. and used for the $H_2S + SO_2$ to sulfur reaction in the absence of COS and $CS_2$, as shown in Table 5. At moisture levels of 1.2% or less, the catalyst functioned with conversion efficiencies of $H_2S + SO_2$ in excess of 89% without generation of $CS_2$ or any excessive amounts of COS for 29 days.

TABLE 5
LIFE TEST ON MAGNESIA SUPPORTED CATALYST

$La_2O_3 \cdot Co_2O_3$ (15% volume) blended with MgO
17 cc of $-10/+20$ mesh presulfided at 300° C.
Feed: as for neat catalysts, nominally 1.0% $H_2S$, 0.5% $SO_2$, 0.15% CO, 0.5% $H_2$, 0.0-1.2% $H_2O(g)$, 20.1% $CO_2$, balance = $N_2$.
Results in % conversion of ($H_2S + SO_2$) to $1/x\ S_x$:
with 1.2% $H_2O(g)$:
   1st day of operation = 89.2 ± 0.3% with 50 ppm COS
   29th day of operation = 90.8 ± 0.8% with 12 ppm COS
with 0.0% $H_2O(g)$:
   23rd day of operation = 94.5 ± 0.9% with about 10 ppm COS

EXAMPLE XIV

Another sample of $La_2O_3 \cdot 1.02\ Co_2O_3$ prepared according to Example IX was pretreated at 350° C. with the gas stream shown in Table 1 with 800 ppm COS and 200 ppm $CS_2$ present and a $H_2O(g)$ level of 3.0%. After 30 days of continuous operation at 325° C. and a ghsv = 2000 v/v/hr, the effluent from the first stage remained constant at a COS emission of less than 80 ppm and $CS_2$ at a non-measurable (less than 5 ppm) concentration.

EXAMPLES XV TO XVII

Spheres of $\gamma$-alumina of 3/32" (0.24 cm) diameter and surface area of about 80 $m^2/g$ were impregnated with nitrate solutions containing (Example XV) 100 g La($NO_3$)$_3 \cdot 6H_2O$ in 200 ml of deionized water, and (Example XVII) 100 g La($NO_3$)$_3 \cdot 6H_2O$ plus 100 g Co($NO_3$)$_2 \cdot 6H_2O$ in 200 ml of deionized water. After soaking for 30 minutes, the liquids were decanted and the pellets dried at 120° C. for 2 hrs. The pellets were then fired at 400° C. in air for 1.5 hrs. In all cases, the weight gain was approximately 15%.

Figure 2:
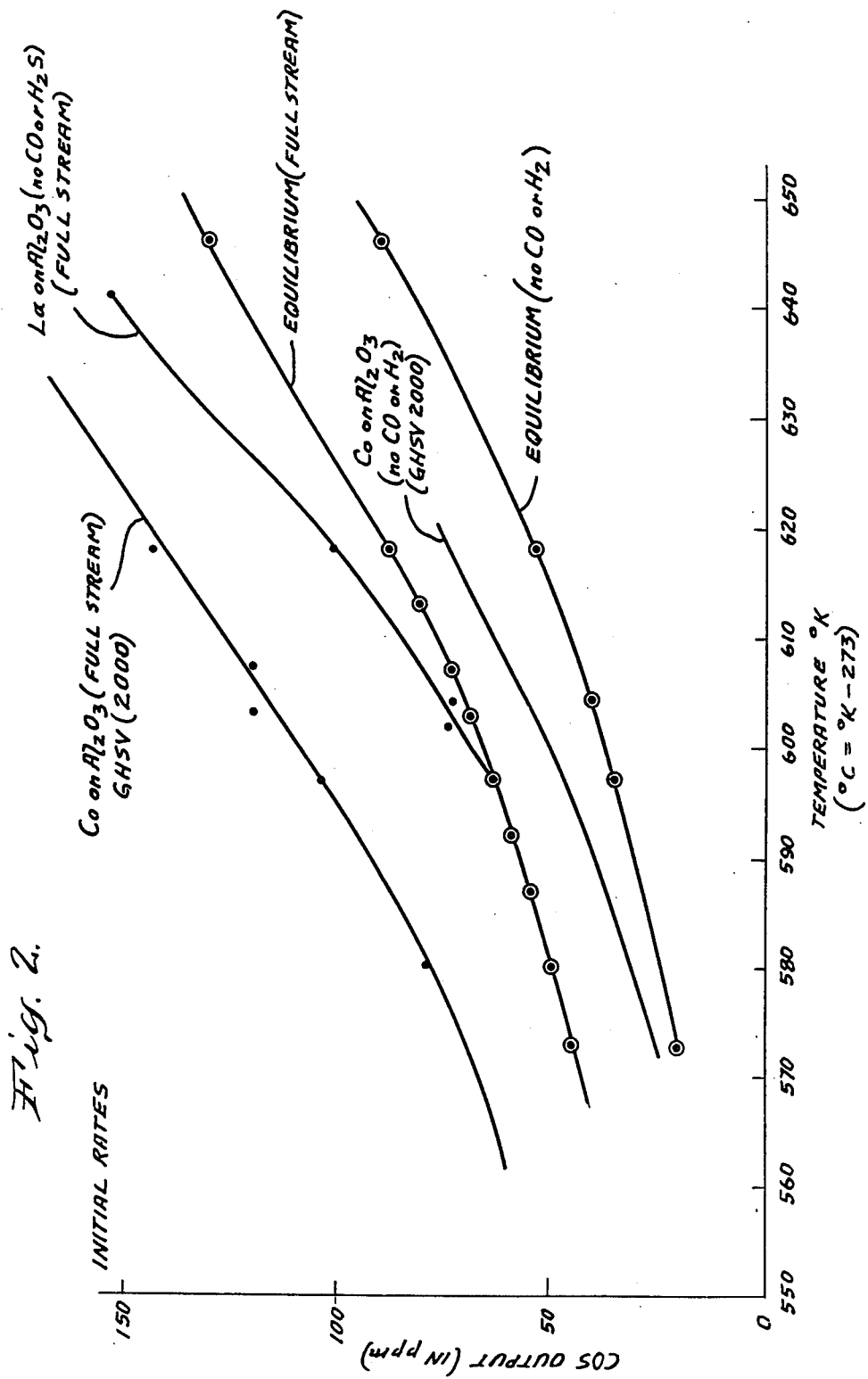
FIGS. 2, 3 and 4 are graphs showing the experimental results obtained in Examples XV, XVI and XVII, respectively, below.
Figure 3:
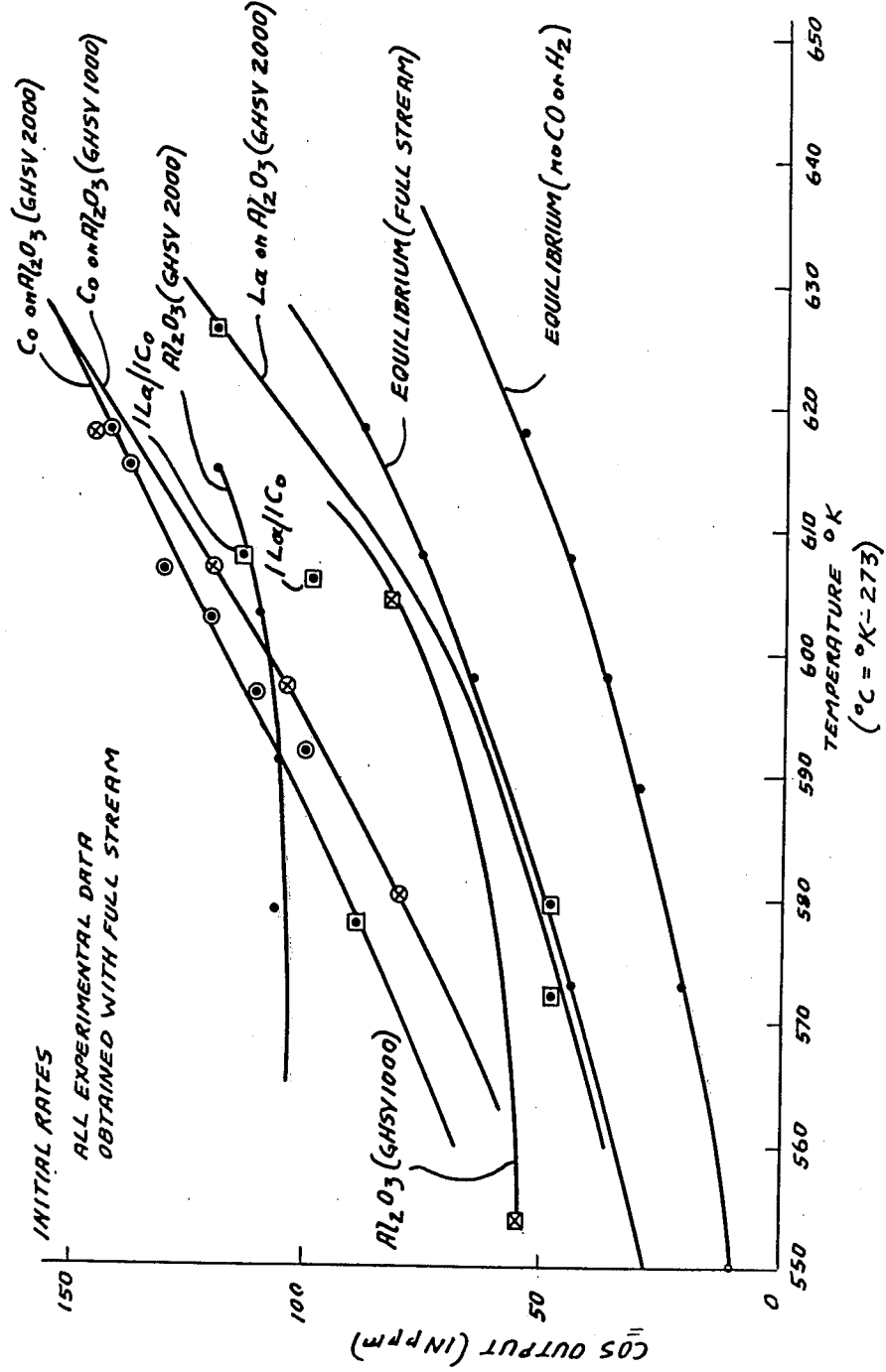
Figure 4:
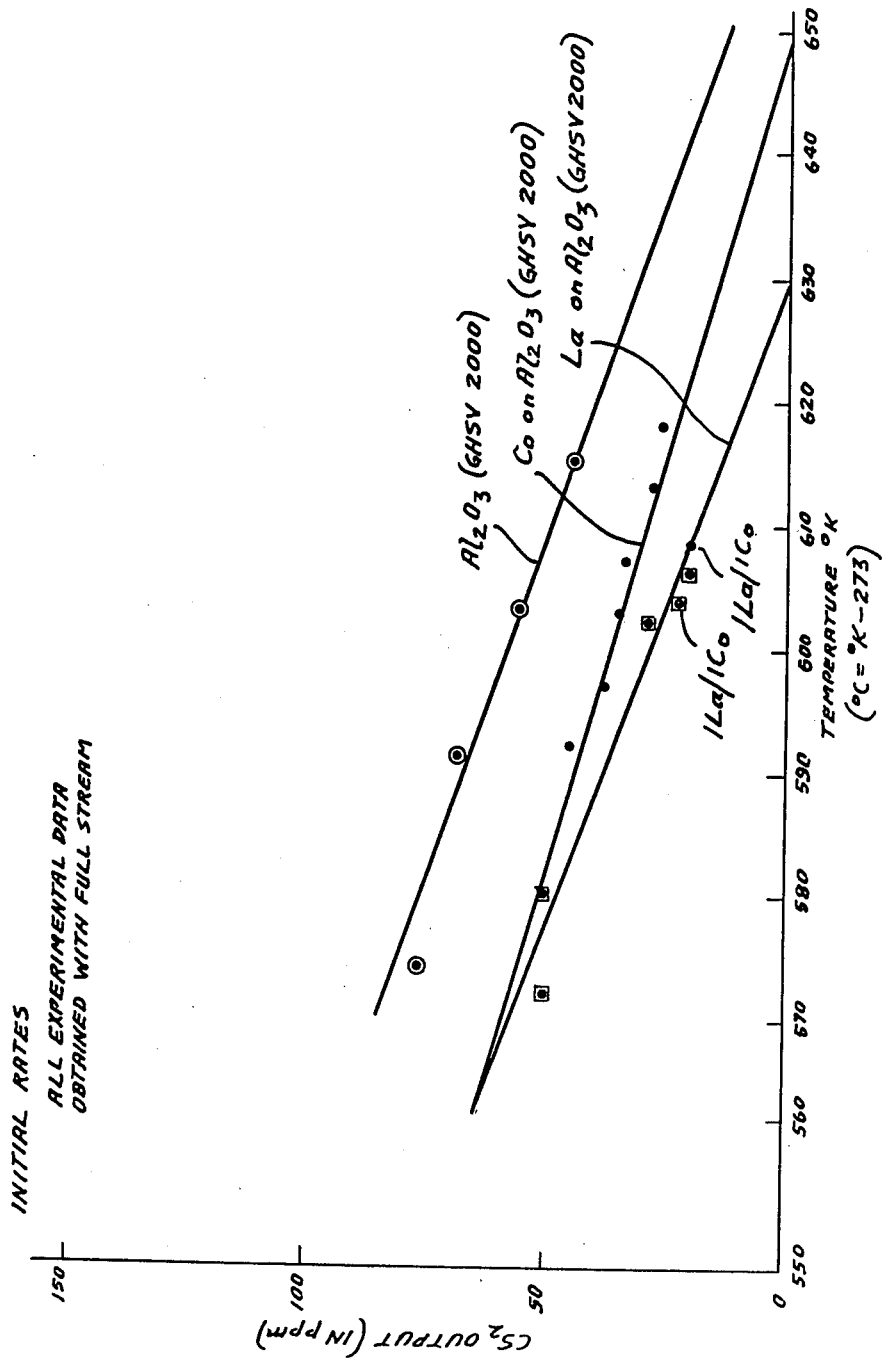

These samples were then evaluated under first stage conditions containing the 800 ppm COS, 200 ppm $CS_2$, 0.5% $SO_2$, 1.0% $H_2S$, 20.0% $CO_2$, 3.0% $H_2O(g)$, variable concentrations of CO from 0.0 to 0.15, variable concentrations of $H_2$ from 0.0 to 0.5%, with the balance = $N_2$. The ghsv was maintained at 2000 v/v/hr but the temperature was varied from 300° C. to 375° C. The results which are shown in FIG. 2 (Example XV), FIG. 3 (Example XVI) and FIG. 4 (Example XVII) demonstrate quite conclusively that the optimal ratio of lanthanum to cobalt for COS conversion depends markedly on the constituents in the gas stream, in this case the CO and $H_2$ concentrations. Hence, the ability to vary the coefficients x and y of $La_2O_3$ and $Co_2O_3$ make our catalyst especially attractive in comparison to a distinct compound such as $LaCoO_3$. For example, one can see that if there were no CO nor $H_2$ in the feed stream, a supported cobalt catalyst could be the catalyst of choice. However, with streams containing the usual amounts of CO and $H_2$, a supported cobalt catalyst would be the least efficient with lanthanum on alumina being a better catalyst than even the 1 La/1 Co material. FIG. 4 shows, however, that the 1 La/1 Co material is equivalent to that of lanthanum alone for $CS_2$ conversions. Hence, the La to Co ratio must be varied to give optimal conversions of $H_2S$, $SO_2$, COS and $CS_2$ and the ratio depends quite markedly on the other constituents in the gas stream.

In all three of these examples with 3% $H_2O$ (g), it can be observed from the Figures that for COS conversion, efficiency declines with increasing temperature. It is considered that a temperature of about 350° C. (623° K.) is the maximum for overall satisfactory results.

EXAMPLE XVIII

A gas stream was synthesized to contain 15% $CO_2$, 7% $H_2S$, 3.0% $SO_2$, 0.5% $O_2$ and 71.0% $N_2$ and 3.5% $H_2O$ (g). Using the reactor described in Examples XV–XVII with a gas hourly space velocity of 2000 v/v/hr over the neat material of this sample of Example I (i.e., $La_2O_3 \cdot Co_2O_3$), the exiting components from the first stage, as a function of reactor temperature, are set forth in Table 6.

TABLE 6

| Temperature (°C.) | $H_2S$ % | COS % | $SO_2$ % | S % (by Difference from 10%) | Overall Conversion to S |
|---|---|---|---|---|---|
| 485 | 0.62 | 0.015 | 1.65 | 7.715 | 77.2% |
| 440 | 0.15 | 0.015 | 1.44 | 8.395 | 84.0% |
| 400 | 0.16 | 0.014 | 1.42 | 8.406 | 84.1% |
| 330 | 0.15 | Not Detected | 0.68 | 9.170 | 91.7% |
| 250 | 0.08 | Not Detected | 0.73 | 9.190 | 91.9% |

These data show that reduction of both $H_2S$ and COS levels is favored by low (350° C. or lower) reaction temperatures.

EXAMPLE XIX

A catalyst according to Example II was prepared except that, instead of firing the catalyst at 350° C., it was fired twice for 2 hours at 700° C. with mixing in a mortar and pestle between these firings. This catalyst was used in both the first and second stages described below.

A gas stream was synthesized to contain 15% $CO_2$, 2% $H_2S$, 1% $SO_2$, 3.5% $H_2O(g)$ and 73.5% $N_2$. The reactor system had two furnaces in series with a sulfur condensor between. The components exiting from each stage, as function of temperature measured in the catalyst beds, and gas hourly space velocity, are shown in Table 7.

TABLE 7

| Temp. °C. | Stage | ghsv | H$_2$S % | SO$_2$ % | S % (By Difference From 3%) | Overall Conversion To S |
|---|---|---|---|---|---|---|
| AFTER 1 HOUR FROM START OF RUN: | | | | | | |
| 350 | 1 | 3698 | 0.42 | 0.18 | 2.40 | 80.0% |
| 350 | 2 | 3698 | 0.07 | 0.10 | 2.93 | 97.7% |
| AFTER 24 HOURS FROM START OF RUN: | | | | | | |
| 300 | 1 | 2000 | 0.25 | 0.12 | 2.63 | 87.7% |
| 300 | 2 | 2000 | 0.10 | 0.07 | 2.83 | 94.3% |
| 280 | 1 | 2000 | 0.24 | 0.10 | 2.66 | 88.7% |
| 260 | 2 | 2000 | 0.03 | 0.02 | 2.95 | 98.3% |
| 250 | 2 | 2000 | 0.02 | 0.025 | 2.955 | 98.5% |
| 240 | 2 | 2000 | 0.02 | 0.02 | 2.96 | 98.7% |
| 214 | 2 | 2000 | 0.02 | 0.015 | 2.965 | 98.8% |
| AFTER 48 HOURS FROM START OF RUN: | | | | | | |
| 300 | 1 | 3200 | 0.18 | 0.09 | 2.71 | 90.3% |
| 214 | 2 | 3200 | 0.009 | 0.040 | 2.951 | 98.4% |

No COS was detected under any of the above conditions. The final result, based on the initial 3% of sulfur components, represents a 90.3% conversion to sulfur in one stage and a 98.4% conversion to sulfur after the second stage. This example further illustrates the utility of the catalysts of this invention in both the first and second stages of the process.

EXAMPLE XX

This example illustrates the use of the catalyst of this invention for the oxidation, in the presence of large concentrations of oxygen, of a waste gas stream having a higher concentration of H$_2$S. It also demonstrates the use of the catalyst in a pre-first stage catalytic reactor which may replace the usual combustion stage of a Claus plant. A stream of gases (see below) is fed to a stainless steel manifold. From the manifold, the gases pass through a mixing chamber, a 1" (2.5 cm) diameter, 18" (45.7 cm) long stainless steel tube filled with ¼" (0.6 cm) diameter quartz balls, then through a preheating zone where the temperature of the gas stream is raised to approximately that of the test reactor, and then to the test reactor, a 2" (5.1 cm) outer diameter tube furnace surrounding a ½" (1.3 cm) diameter, 18" (45.7 cm) long quartz tube having fitted joints at both ends. The material charged to the reactor (about 0.75 grams) is supported, about 3" (7.6 cm) above the bottom of the reactor, by a small amount of Fiberfrax wool. The effluent from the reactor goes into a sulfur collector, a 250 ml. 2-neck flask. Samples of the effluent were taken from the flask for analysis with a gas chromatograph.

The gas stream which contained 15% CO$_2$, 3.5% H$_2$O(g), 7.0% H$_2$S, 3.5% O and 71% N$_2$ (all volume percent), was passed through the above reactor charged with 0.7 cc. of neat (unsupported) La$_2$O$_3$.3Co$_2$O$_3$ at a temperature of 700° C. and a gas hourly space velocity of about 2000 v/v/hr (corresponding to a flow rate of 23.3 ml/min.). The H$_2$S is reduced 76% to 1.70%, while only 0.60% SO$_2$ and 0.084% COS are formed. By difference from 7%, the overall H$_2$S conversion to sulfur in this single pass (first stage) is 66%.

EXAMPLE XXI

The process of Example XX is repeated with the formulations and results set forth in Table 8 below.

TABLE 8

| Material Charged To Reactor | Percent Of Initial H$_2$S Removed | SO$_2$ Formed | COS Formed | Percent Of Initial H$_2$S Converted To Sulfur |
|---|---|---|---|---|
| 3 La$_2$O$_3$.Co$_2$O$_3$ of Example XX | 68% | 0.40% | 0.080% | 61% |
| La$_2$O$_3$.1.02 Co$_2$O$_3$ of Example XIX | 71% | 0.30% | 0.026% | 61% |

EXAMPLE XXII

A gas containing 0.6% H$_2$, 1.3% H$_2$O, 0.18% CO, 33.68% CO$_2$, 9.47% O$_2$, 36.6% N$_2$ and 18.16% H$_2$S is passed through the reactor described in Example XX, charged with La$_2$O$_3$. 1.02 Co$_2$O$_3$ operating at 700° C. with a space velocity of 2,000 v/v/hr. The following result was obtained:

TABLE 9

| Percent Of Initial H$_2$S Removed | SO$_2$ Formed | COS Formed | Percent Of Initial H$_2$S Converted To Sulfur |
|---|---|---|---|
| 85.5% | 1.0% | 0.16% | 79% |

After precipitation of the sulfur, the effluent from this reactor can be treated by the process of this invention.

EXAMPLE XXIII

This example describes the preparation of a catalyst especially suitable for the elmination of carbonyl sulfide from gas streams.

La$_2$O$_2$S with surface area of 30 m$^2$/g was prepared by freeze drying a paste containing 2 gms of La(NO$_3$)$_3$ and 14 gms of high surface area carbon (shawinigan black, about 100 m$^2$/g) in 100 ml of H$_2$O. After vacuum drying for 2 days, the material was heated to 350° C. in vacuum for 4 hours. The material was then slowly heated in air over a six hour period up to a temperature of 700° C. so as to oxidize all the carbon to CO$_2$. The resulting oxide was then converted to oxysulfide by reacting it with either wet H$_2$S in N$_2$ or with 10% COS and 5% SO$_2$ in N$_2$ at 750° C.

EXAMPLE XXIV

The catalytic behavior of low surface area La$_2$O$_2$S (0.28 m$^2$/g), high surface area La$_2$O$_2$S (30.0 m$^2$/g) as well as that of low surface area quartz (0.07 m$^2$/g) was examined, in the thermal decomposition of COS. The high surface area La$_2$O$_2$S is the product of Example XXIII. The low surface area La$_2$O$_2$S and the quartz are both commercially available, the former from GTE Sylvania, Inc. (Towanda, Pa.).

The gas mixtures contained 20% COS in N$_2$. In order to compare the efficiency of La$_2$O$_2$S (0.28 m$^2$/g) with the SiO$_2$ (0.07 m$^2$/g), account had to be made for the 4/1 ratio in surface areas of these catalysts. Consequently, the space velocities were adjusted so that 15,000 ghsv was used for fused silica and 60,000 ghsv for La$_2$O$_2$S. Since commercial catalysts are usually of larger surface areas and since commercial gas streams are usually of lower space velocities, the thermal decomposition of COS was also examined using La$_2$O$_2$S with a surface area of about 30 m$^2$/g and a gas hourly space velocity of 6000 ghsv. The results are shown in the following Table 10.

TABLE 10

| Temp. °C. | Fused Silica Catalyst* % COS Decomposed | **$La_2O_2S$ Catalyst % COS Decomposed | ***$La_2O_2S$ Catalyst % COS Decomposed | Equilibrium Calculations |
|---|---|---|---|---|
| 450 | — | — | 23 | 48 |
| 500 | — | 10.0 | 28 | 52 |
| 550 | 5.7 | 16.5 | 36 | 54 |
| 600 | 8.9 | 25.7 | 44 | 57 |
| 650 | 13.6 | 31.4 | 53 | 62 |
| 700 | 27.7 | 42.8 | 62 | 67 |

*$SiO_2$ (0.07 m²/g and 15,000 ghsv)
**$La_2O_2S$ (0.28 m²/g and 60,000 ghsv)
***$La_2O_2S$ (30 m²/g and 6,000 ghsv)

These data show that both $La_2O_2S$ and, to a lesser extent, fused silica can serve as catalyst for the thermal decomposition of COS. Increasing both the surface area and decreasing the gas hourly space velocity, moreover, improves the catalytic efficiency and decrease in space velocity should allow this reaction to approach equilibrium.

EXAMPLE XXV

A series of experiments was performed to determine the effectiveness of $La_2O_2S$ as a catalyst for the oxidation of high concentrations of COS by $SO_2$ using the catalysts of Example XXIV. The investigation included the determination of the effect of increasing the surface area and varying such process parameters as space velocity and temperature. The results are shown in the following Table 11, where the gas composition is 12% COS and 5% $SO_2$ in $N_2$.

TABLE 11

| Temp. °C. | *$SiO_2$ | **$La_2O_2S$ | ***$La_2O_2S$ | Equilibrium Calculations |
|---|---|---|---|---|
| | | | % Conversion of COS to Sulfur | |
| 700 | 52 | 80 | 96 | 91 |
| 650 | 47 | 66 | 95 | 88 |
| 600 | 21 | 63 | 95 | 87 |
| 550 | 13 | 50 | 94 | 86 |
| 500 | — | — | 95 | 85 |
| 450 | — | — | 95 | 85 |
| 400 | — | — | 78 | 85 |
| 375 | — | — | 24 | 84 |
| 350 | — | — | 5 | 84 |
| 300 | — | — | — | 84 |

+ Since excess COS was used and no water vapor was present, 100% conversion is not expected in this experiment.
*$SiO_2$(0.07 m²/g and 15,000 ghsv)
**$La_2O_2S$(0.28 m²/g and 60,000 ghsv)
***$La_2O_2S$(30 m²/g and 6,000 ghsv)

The data show that $La_2O_2S$ is a much better catalyst than $SiO_2$ for the reduction of $SO_2$ by COS even when account is made for the differences in surface area of these materials. The data further show the advantages of higher temperatures (400° C. to 700° C.) in this "special" reaction stage when there is no water vapor present.

EXAMPLE XXVI

A series of experiments was run in order to investigate the different catalytic activity of the $LaCoO_3$ catalyst disclosed in Whelan et al, U.S. Pat. No. 3,926,854, and our catalyst having essentially the same empirical formula.

The Whelan catalyst was prepared exactly according to Example 1 of U.S. Pat. No. 3,926,854. An aqueous mixture of 6 moles of $La(NO_3)_3$ and 6 moles of $Co(NO_3)_3$ was prepared from the corresponding nitrate salts. The solution was boiled and evaporated to dryness, and the resulting residue was calcined in air at 1200° C. to produce a fine powder.

Our catalyst was the substance of Example II of the formula $La_2O_3.1.02\ Co_2O_3$.

The physical characteristics are shown in the following Table 12.

TABLE 12

| Sample | Bulk Crystalline Phases (by x-ray diffraction) | Surface area m²/g |
|---|---|---|
| $LaCoO_3$ of Whelan Example I | single phase $LaCoO_3$ | 0.07 |
| $La_2O_3.1.02\ Co_2O_3$ of our Example II | $La_2O_2CO_3$ major $Co_3O_4$ minor | 24.9 |

The two catalysts were tested in the Claus reaction $$2\ H_2S + SO_2 \rightarrow 3/2\ S_2 + 2\ H_2O$$

on a feed stream containing 0.98% $H_2S$, 0.53% $SO_2$, 0.14% CO, 0.52% $H_2$, 19.7% $CO_2$, 1.2% $H_2O$ (gas), and the balance $N_2$. Catalyst volume was 1.5 cc, and the reaction temperature was 250° C. The results are shown in Table 13.

TABLE 13

| Catalyst | Space Velocity (v/v/hr) | % Conv. of $H_2S$ | COS Formed (ppm) | $SO_2$ % Conv. | % Conv. To S |
|---|---|---|---|---|---|
| $LaCoO_3$ of Whelan Example 1 | 1000 | 2.3 | ND | 7.7 | 2.9 |
| | 2000 | * | ND | 5.0 | * |
| $La_2O_31.02\ Co_2O_3$ of our Example II | 2000 | 85.5 | 44 | 93.5 | 90.3 |
| | 60000 | 77.3 | NM | 59.8 | 72.0 |

ND = Not Detected
NM = Detectable but Not Measurable
*$H_2S$ peak in exit stream slightly larger than feed stream peaks were actually measured.

It can be readily seen that, in the Claus reaction, the high surface area catalyst of our Example II is far more effective than the highly crystalline catalyst disclosed in U.S. Pat. No. 3,926,854. The non-detectable levels of COS formed using the Whelan catalyst show that there is little or no conversion of $H_2S$ to sulfur since the only source of COS would be the reaction of CO with S. In any case, as discussed previously, the dependence of the catalytic activity on gas stream composition, including CO and $H_2$, precludes the use of Whelan's single phase material.

The same batch of $LaCoO_3$ of Whelan's Example I was pretreated in a gas stream now containing 0.08% COS and 0.02% $CS_2$, in addition to 1% $H_2S$, 0.5% $SO_2$, 0.15% CO, 0.50% $H_2$, 20.0% $CO_2$, 3.0% $H_2O(g)$, balance=$N_2$, overnight at 350° C. The reactor temperature was then lowered to about 330° C., and the system allowed to equilibrate overnight. The results were then compared with those obtained from another batch of Example II of this invention which was pretreated in the same manner, and are reported in Table 14.

TABLE 14

| Catalyst | Space Velocity | % Conversion $H_2S$ | COS | $SO_2$ | $CS_2$ |
|---|---|---|---|---|---|
| $LaCoO_3$ of Whelan Example I $LaCoO_3$ of our | 2000 | 17% | 16% | 36% | 10% |

TABLE 14-continued

| Catalyst | Space Velocity | % Conversion | | | |
|---|---|---|---|---|---|
| | | $H_2S$ | COS | $SO_2$ | $CS_2$ |
| Example II | 2000 | 58% | 90% | 80% | 100% |
| *Equilibrium Conversions | — | 53% | 95% | 64% | 100% |

*Equilibrium Calculations were obtained under the assumption that $H_2$ and CO are inert. Since some reaction between $SO_2$ and $H_2$ and/or CO occurs, the apparent $SO_2$ conversions are better than equilibrium values.

The somewhat higher conversion percentages for $H_2S$ and $SO_2$ by the Whelan catalyst in Table 14 over the Whelan catalyst in Table 13 are believed to be due to the formation of the active component $CoS_2$ resulting from the pretreatment. Nevertheless the conversion rates attained by the use of the catalysts of our invention are considerably higher than are attained with the Whelan catalyst.

With respect to the catalyst of this invention and the Whelan catalyst tested, x-ray diffraction patterns show the following:

(a) in the lanthanum-cobalt catalyst of this invention, an x-ray diffraction curve obtained prior to any pretreatment shows broad, poorly resolved peaks characteristic of a poorly crystallized material. The major phase appears to be $La_2O_2.CO_3$, with a minor phase of $Co_3O_4$.

(b) for the catalyst of this invention, an x-ray diffraction curve obtained after pretreatment in the process stream shows considerable decomposition of the catalyst with conversion to $CoS_2$. The major phases are $La_2O_2.CO_3$ and $CoS_2$, with possibly some cobalt.

(c) in the lanthanum cobaltate catalyst prepared according to the method of Whelan's Example I, an x-ray diffraction curve obtained prior to pretreatment shows sharp, well-defined peaks of single phase, well-crystallized $LaCoO_3$ of the perovskite structure.

(d) in the lanthanum cobaltate catalyst obtained by Whelan's method, an x-ray diffraction curve obtained after pretreatment in the process stream is identical to that of (c) above, still shows the sharp well-defined peaks of lanthanum cobaltate of perovskite structure. There is, however, some decomposition and sulfiding of the catalyst resulting from the pretreatment.

EXAMPLE XXVII

Using the catalyst prepared in Example IX and the reactor system previously described, a gas composition simulating the final stage feed stream was processed according to the third stage of the process of this invention. The catalyst was pretreated by sulfiding overnight with 1.07% of $H_2S$ in $N_2$ at a ghsv of 2800. Table 15 shows the compositions of the feed stream and of the output over a period of time. The operating ghsv of this stage was 4000.

TABLE 15

INPUT

| Component | % |
|---|---|
| $H_2S$ | 0.0133 |
| $SO_2$ | 0.0067 |
| COS | 0.0080 |
| $CS_2$ | 0.0010 |
| $CO_2$ | 20.0 |
| CO | 1.5 |
| $H_2$ | 2.2 |
| $H_2O(g)$ | 7.0 |
| $O_2$ | 1.88 |
| $N_2$ | Balance |

OUTPUT

TABLE 15-continued

| Day | Temp. | COS (ppm) | $H_2S$ (ppm) | $CS_2$ (ppm) | $SO_2$ (ppm) |
|---|---|---|---|---|---|
| 2 | 182 | 94 ± 4 | ND | 12 ± 2 | 158 ± 4 |
| 6 | 181 | 87 ± 2 | ND | 10 ± 1 | 161 ± 6 |
| 9 | 201 | 92 ± 1 | ND | 12 | 152 ± 12 |
| 20 | 199 | 96 ± 1 | ND | 14 ± 1 | 181 ± 4 |
| 22 | 199 | 96 ± 1 | NM | 13 | 168 ± 7 |
| 26 | 199 | 88 ± 1 | <10 | 11 ± 1 | 143 ± 8 |
| 33 | 201 | 88 ± 1 | NM | 10 | 161 ± 7 |
| 34 | 199 | 97 ± 2 | ~10 | 12 ± 1 | 158 ± 24 |
| 37 | 201 | 83 ± 1 | <10 | 8 ± 1 | 142 ± 10 |
| 40 | 200 | 88 ± 1 | ~10 | 10 ± 1 | 166 ± 14 |
| 43 | 202 | 78 ± 2 | NM~<10 | 6 ± 2 | 137 ± 20 |

These data show that, over a period of 43 days, the catalyst of this invention is capable of meeting current regulatory requirements as to levels of sulfur-containing gases. Even after 50 days, when the $H_2S$ level consistently exceeded 10 ppm, the catalyst was regenerated by resulfiding at 350° C. by 10% $H_2S$ in $N_2$ to restore original non-detectable $H_2S$ performance.

EXAMPLE XXVIII

The supported material prepared as in Example XVII was also presulfided in 10% $H_2S$ at 350° C. and subjected to the final stage conditions as in Example XXVII. The results shown in Table 16 demonstrate that at least more than a 17-day life is expected at a ghsv of as high as 4000 v/v/hr with a reaction temperature maintained at 200° C. A much longer life is obtained when the reaction temperature is raised to 300° C.

TABLE 16

Alumina Supported $La_2O_3.Co_2O_3$

Supported 1 La/1 Co sample presulfided in 10% $H_2S$ ~ 2000 ghsv over weekend at 350° C.
Feed stream- same as in Table 15, with addition of 8% $CO_2$

| Temp. 200° C. | Day | COS (ppm) | $H_2S$ (ppm) | $CS_2$ (ppm) | $SO_2$ |
|---|---|---|---|---|---|
| | 1 | 35 | ND | 7 | 195 |
| | 2 | 48 | ND | 7 | 196 |
| | 3 | 57 | ND | 7 | 185 |
| | 4 | 67 | ND | 7 | 170 |
| | 7 | 93 | ND | 9 | 160 |
| | 9 | 100 | ND-NM | 7 | 125 |
| | 10 | 100 | ND | 7 | 117 |
| | 11 | 94 | ND-NM | 8 | 127 |
| | 14 | 89 | ND | 9 | 136 |
| | 15 | 89 | NM≲8 | 9 | 158 |
| | 16 | 88 | NM≲8 | 7 | 128 |
| | 17 | 88 | 10 | 10 | 130 |
| | 18 | 87 | NM < 8 | 8 | 133 |
| | 21 | 89 | ~17 | 9 | 166 |
| | 22 | 86 | ~18 | 9 | 137 |

Sample was then heated at 300° C. overnight in normal gas stream, i.e., 1.88% $O_2$, 133 ppm $H_2S$, etc.

| Temp. | Day | COS | $H_2S$ | $CS_2$ | $SO_2$ |
|---|---|---|---|---|---|
| 205 | 24 | 82 | 36 | 8 | 131 |
| 300 | 24 | 68 | 6 | 8 | 163 |

The latter results demonstrate that (a) 300° C. heat treatment of used catalyst does not improve catalyst performance when operated at 200° C.; and (b) performance of used catalyst is, however, satisfactory when operated at 300° C. Retreatment with 10% $H_2S$ again restores the catalyst to its original efficacy. This recycling sequence was performed 6 times at 11-day intervals and the catalyst still performed adequately to meet specifications. Table 17 also shows that the same aged catalyst performs adequately at temperatures at or below 190° C.

TABLE 17

Alumina Supported $La_2O_3.Co_2O_3$ Sulfided with 10% $H_2S$ at about 2000 ghsv over weekend at 350° C.

| 4000 ghsv Temp. °C. | $H_2S$ in Output (ppm) | COS in Output (ppm) | $SO_2$ in Output (ppm) |
|---|---|---|---|
| 150 | 58 | 85 | 60 |
| 170 | 15 | 74 | 91 |
| 190 | 6 | 64 | 112 |
| 210 | 3 | 57 | 129 |
| 230 | 2 | 51 | 142 |
| 250 | 2 | 45 | 153 |
| 270 | 2 | 40 | 164 |
| 290 | 1 | 33 | 170 |

Figure 5:
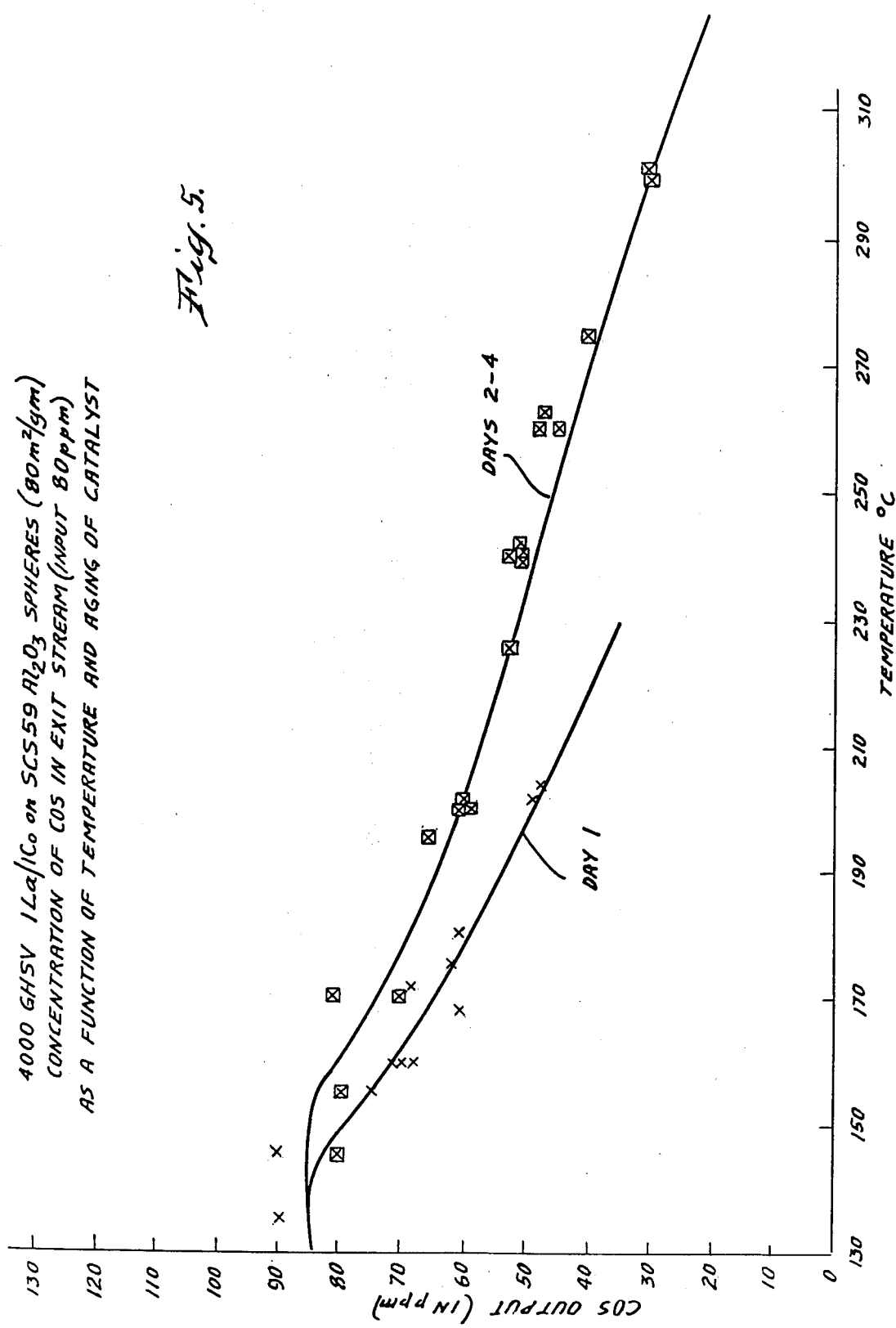
FIGS. 5 and 6 are graphs showing some of the experimental results obtained in Example XXVIII below.
Figure 6:
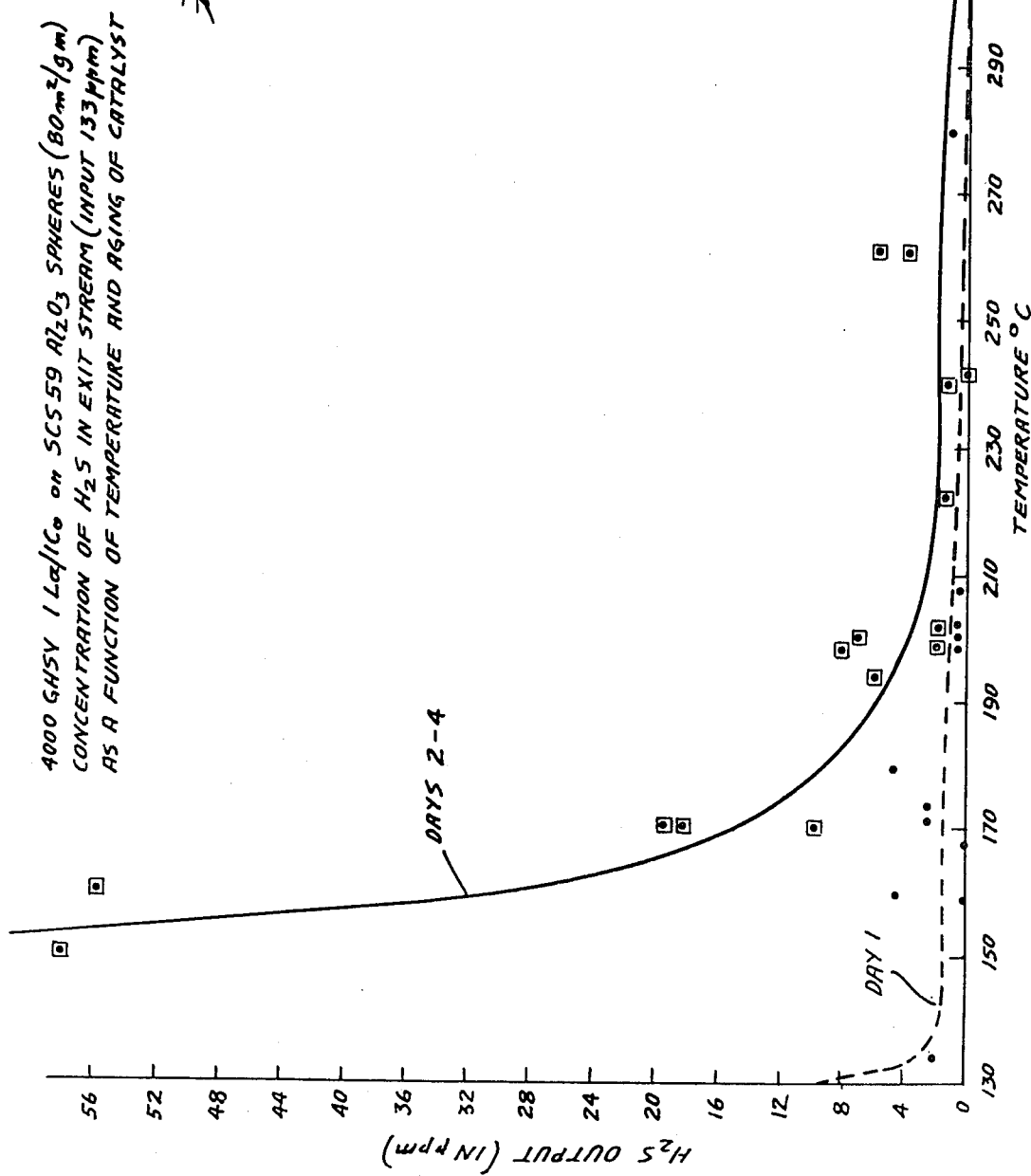

FIGS. 5 and 6 plot the outputs of COS and $H_2S$, respectively, as a function of final stage reaction temperature and aging of the catalyst.

EXAMPLE XXIX

The materials of Examples XVI were subjected to the same pretreatment and feed stream of Example XXVIII. Results shown in Tables 18, 19 and 20 demonstrate that under these particular third stage (air oxidation) conditions, the cobalt-on-alumina catalyst is a better catalyst than either lanthanum-on-alumina or alumina alone. This again demonstrates the need for tailoring the catalyst for the specific gas composition to be processed.

TABLE 18

Cobalt-on-Alumina tested at 8000 ghsv. Feed conditions as in Table 9.

| | | OUTPUT | | | |
|---|---|---|---|---|---|
| Day | Temp. °C. | COS (ppm) | $H_2S$ (ppm) | $CS_2$ (ppm) | $SO_2$ (ppm) |
| 1 | 200 | 65 | ND | 9 | 152 |
| 2 | 200 | 88 | ND | 8 | 127 |

TABLE 19

Lanthana-on-Alumina tested at 4000 ghsv. Feed conditions as in Table 9.

| | | OUTPUT | | | |
|---|---|---|---|---|---|
| Day | Temp. °C. | COS (ppm) | $H_2S$ (ppm) | $CS_2$ (ppm) | $SO_2$ (ppm) |
| 1 | 200 | 59 | 2 | 8 | 222 |
| 2 | 200 | 27 | 124 | 8 | 38 |

TABLE 20

Alumina Support Alone tested at 4000 ghsv. Feed conditions as in Table 9.

| Day | Temp. °C. | COS (ppm) | $H_2S$ (ppm) | $CS_2$ (ppm) | $SO_2$ (ppm) |
|---|---|---|---|---|---|
| 1 | 200 | 88 | 76 | 8 | 137 |
| 2 | 200 | 70 | 126 | 10 | 50 |

EXAMPLE XXX

A series of experiments was performed according to the first stage of the process described in Example X, using the feed stream and the reaction conditions of said example. However, the catalysts employed were (a) 1 $La_2O_3.1$ $Co_2O_3$ on $Al_2O_3$ and (b) 1 $La_2O_3.0$ $Co_2O_3$ on $Al_2O_3$, each of which was prepared with surface areas of about 80 m²/g and 250 m²/g. Said catalysts were prepared as follows:

To prepare the 1 $La_2O_3.0$ $Co_2O_3$ catalyst compositions, alumina support of 250 m²/g. and 80 m²/g. surface area was impregnated overnight with a solution consisting of 100 g. of $La(NO_3)_3.6H_2O$ in 200 ml. of water. The impregnated catalyst supports were dried at 130° C. for two hours in air, and then fired at 400° C. for two hours in air. The catalyst samples were sulfided over a two day period in 10% $H_2S$ prior to use.

Figure 7:
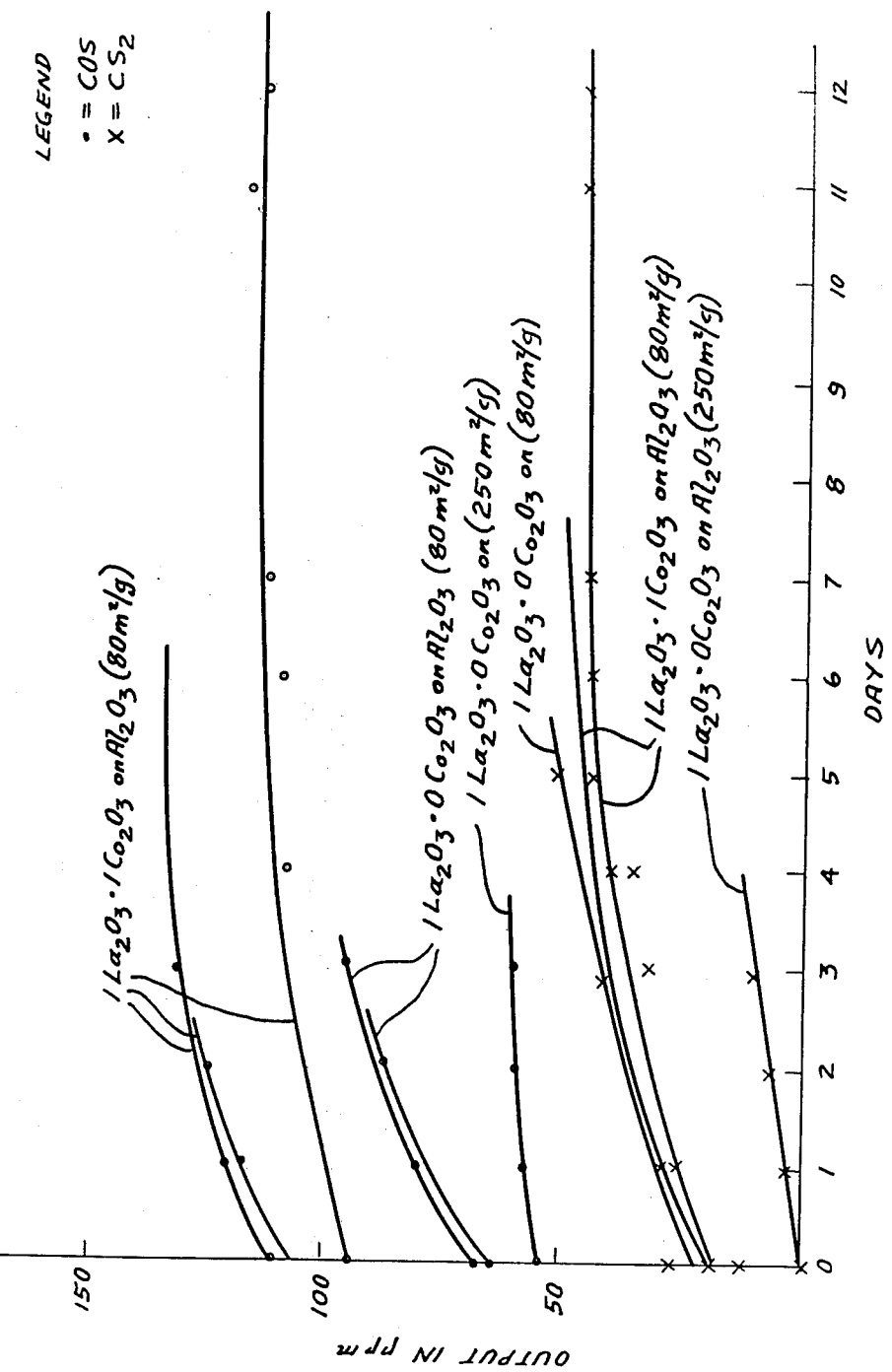
FIG. 7 is a graph showing the experimental results obtained in Example XXX below.

Catalysts comprising 1 $La_2O_3.1$ $Co_2O_3$ supported on $Al_2O_3$ were prepared by impregnating alumina supports of 80 m²/g. and 250 m²/g. surface area overnight with a solution of 100 g. of $La(NO_3)_3.6$ $H_2O$ and 100 g. of $Co(NO_3)_2.6$ $H_2O$. The impregnated alumina supports were dried, fired, and pretreated to produce the support catalysts. Data were obtained for the output of COS and $CS_2$ over a period of 12 days. Said data, which are plotted on the graph shown in FIG. 7, show the effects of removing cobalt and of increasing the surface area of supported La/Co alumina catalysts of this invention. The neat, unsupported catalysts function somewhat better than the supported catalysts, even for periods exceeding 30 days (see, for instance, Example XIV). However, economic considerations dictate the use of supported catalysts for most commercial uses.

EXAMPLE XXXI

To show the effect of replacing lanthanum with yttrium, the first stage of the reaction process of Example X was run with $Y_2O_3$ as the catalyst. Feed stream and process conditions were the same as in Example X. A sample of 1 $Y_2O_3.0$ $Co_2O_3$ (i.e. $Y_2O_3$) was prepared exactly as in Example V for $La_2O_3$, with the exception that yttrium acetate was substituted for lanthanum acetate. The material was found to have a surface area of about 59 m²/g. (Yttrium is known to have catalytic and chemical properties similar to the rare earth lanthanide elements and is normally considered a member of the rare earth series). The properties of this catalyst in the first stage reaction were evaluated and the data appear in the following Table 21.

TABLE 21

| Day | *GHSV v/v/hr | Temp °C. | COS (ppm) | $H_2S$ (ppm) | $CS_2$ (ppm) | $SO_2$ (ppm) |
|---|---|---|---|---|---|---|
| 0 | 8000 | 332 | 119 ± 1 | 3070 ± 48 | 89 ± 7 | 1690 ± 57 |
| 1 | 8000 | 332 | 115 ± 4 | 3430 ± 171 | 102 ± 5 | 2040 ± 91 |
| 2 | 8000 | 332 | 187 ± 5 | 3220 ± 130 | 119 ± 6 | 2080 ± 199 |
| 5 | 8000 | 333 | 239 ± 12 | 2960 ± 60 | 118 ± 4 | 1800 ± 49 |
| 6 | 8000 | 333 | 254 ± 16 | 3190 ± 33 | 119 ± 9 | 2155 ± 113 |
| 7 | 2000 | 331 | 93 ± 8 | 3840 ± 157 | 33 ± 9 | 2175 ± 91 |
| 8 | 2000 | 334 | 103 ± 8 | 3760 ± 101 | 19 ± 4 | 2025 ± 114 |
| 9 | 2000 | 334 | 97 ± 2 | 3920 ± 30 | 17 ± 4 | 2075 ± 58 |
| 12 | 2000 | 334 | 101 ± 4 | 3640 ± 29 | 54 ± 6 | 2290 ± 35 |
| 13 | 2000 | 334 | 62 ± 3 | 3080 ± 98 | 38 ± 7 | 1760 ± 67 |
| 14 | 2000 | 334 | 64 ± 2 | 3015 ± 81 | 32 ± 2 | 1780 ± 57 |

*2000 GHSV is the normal first stage condition.

EXAMPLE XXXII

Figure 8:
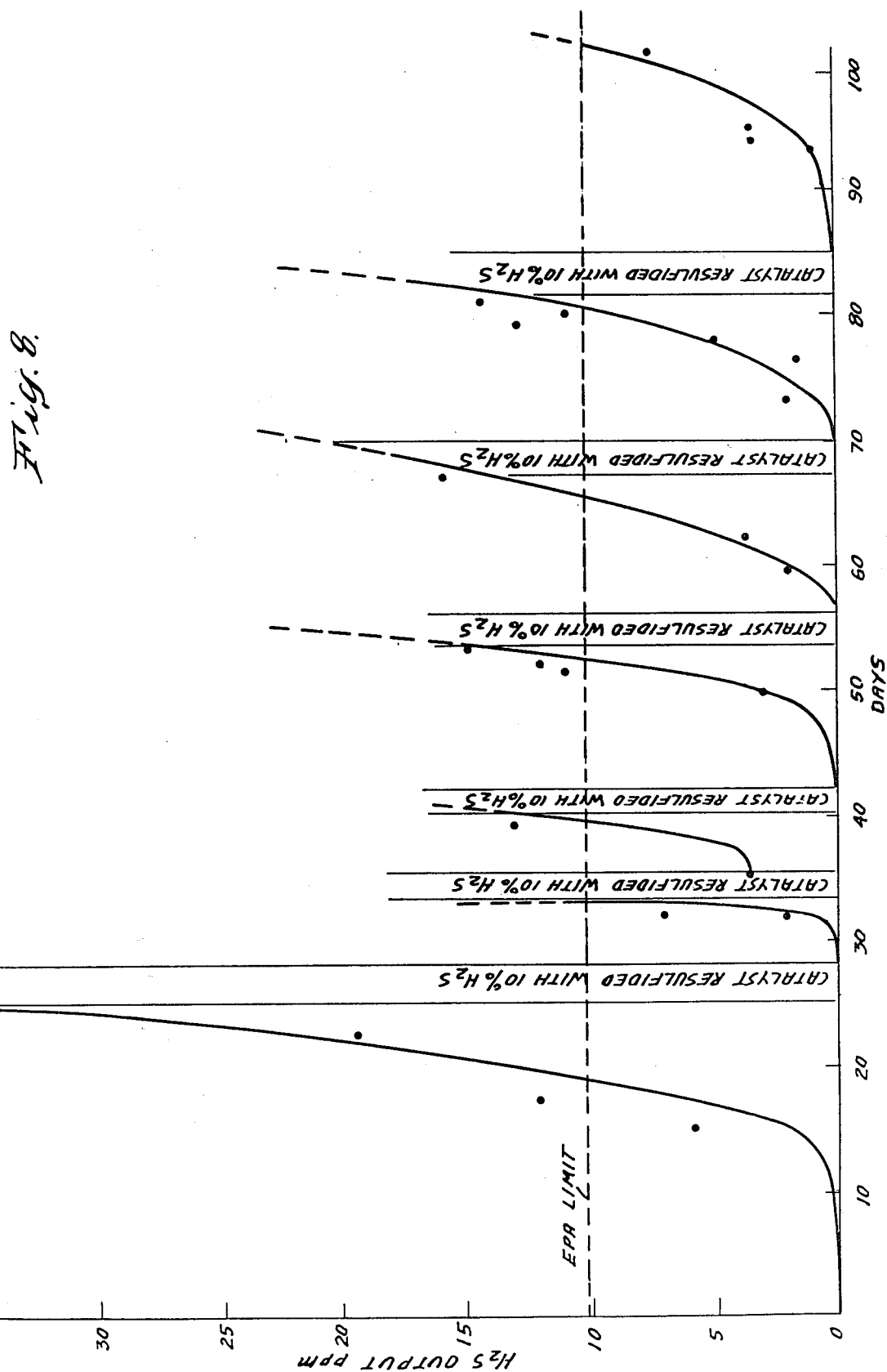
FIG. 8 is a graph showing the experimental results obtained in Exaple XXXII below.

To show the regenerability of the catalysts of our invention, a 1 La$_2$O$_3$.1 Co$_2$O$_3$ catalyst supported on Al$_2$O$_3$ and having a surface area of 80 m$^2$/g was employed in the final (oxidation) stage of the process of Example X. The catalyst is identical to one of the catalysts prepared for Example XXX. In this stage, the ghsv was 4000, but otherwise, the process conditions were the same as in Example X. From time to time, during a period of 105 days, the catalyst was removed from the reaction zone, regenerated by sulfiding in 10% H$_2$S in N$_2$ and then returned to the reaction zone. The data obtained are shown in FIG. 8, which plots amounts of H$_2$S in the output against time. They show that the catalyst can be repeatedly regenerated and still be useful to obtain a product stream with H$_2$S content sufficiently low to meet current requirements.

EXAMPLE XXXIII

A 1 La$_2$O$_3$.1 Fe$_2$O$_3$ catalyst supported on alumina of 250 m$^2$/g. was prepared as follows. Twenty-five grams of alumina support were impregnated overnight with a solution of 40.8 g of La(NO$_3$)$_3$.6 H$_2$O and 27.2 g. of Fe(NO$_3$).9 H$_2$O in 68 ml. of water. The impregnated alumina support was air dried for two hours at 200° C. and then fired for two hours in air at 400° C. The weight gain of the support corresponded to a 12.9 weight percent loading of the support with the mixed lanthanum oxide-iron oxide catalyst. The catalyst was pretreated by exposure to 10% H$_2$S for two days.

The alumina-supported lanthanum oxide-iron oxide catalyst was subjected to third stage conditions in the process according to this invention, and was found to function effectively for over 40 days for the promotion of the air oxidation of H$_2$S to SO$_2$. During the entire 40-day period, the output stream was shown to meet current EPA restrictions on H$_2$S levels.

The supported catalyst sample was regenerated after 47 days by treatment with 10% H$_2$S, and the regenerated catalyst was found to function substantially as the catalyst originally prepared.

While the present invention has been described with reference to specific embodiments thereof, it should be understood by those skilled in this art that various changes may be made and equivalents may be substituted without departing from the true spirit and scope of the invention. In addition, many modifications can be made to adapt a particular situation, material or composition of matter, process, process step or steps, or a then-present objective to the spirit of this invention without departing from its essential teachings.

What is claimed is:

1. A multi-stage process for reducing the content of hydrogen sulfide, sulfur dioxide, carbonyl sulfide and disulfide in a gas stream which comprises
   (a) passing said gas stream through a first reaction stage at a temperature between about 150° and about 350° C., said stage containing a pretreated catalyst of the formula $xLn_2O_3 \cdot yT_2O_3$ in which Ln is yttrium or a rare earth element and T is selected from the group consisting of cobalt, iron and nickel and each of x and y independently is a number from 0 to 3, said catalyst being substantially non-crystalline and having a surface area of from about 10 m$^2$/g to about 40 m$^2$/g and having been prepared at a temperature no higher than 700° C, to obtain elemental sulfur and a first product stream having reduced content of sulfur containing gases,
   (b) passing the first product stream through one or more intermediate catalytic reaction stages in which the Claus reaction occurs, to obtain further elemental sulfur and a second product stream having further reduced content of sulfur containing gases, and
   (c) passing the second product stream through a final reaction stage at a temperature between about 150° and 300° C., said final stage containing a catalyst usable in the first reaction stage, in the presence of air to obtain elemental sulfur and still further reduced content of the sulfur containing gases, which gases can be recyled to an earlier stage.

2. A process according to claim 1 in which Ln is lanthanum.

3. A process according to claim 2 in which the gas stream, the first product stream or second product stream is passed through a special reaction stage at a temperature between about 350° C. and about 700° C. in the absence of water vapor, said stage containing a catalyst of the empirical formula $La_2O_2S$ to obtain a product stream having reduced content of carbonyl sulfide, and said product stream is passed to the next reaction stage.

4. A process according to claim 2 in which T is cobalt.

5. A process according to claim 4 in which each of x and y ranges from 1 to 3, including non-integers.

6. A process according to claim 2 in which the temperature in the intermediate reaction stage is below about 130° C.

7. A process according to claim 2 in which the temperature in the final reaction stage is about 200° C.

8. A process according to claim 1 in which the gas stream contains more than about 7% of hydrogen sulfide and it is processed, prior to the first reaction stage, through a preliminary reaction stage at a temperature of between about 150° C. and about 750° C., said stage containing a catalyst usable in the first reaction stage, to obtain elemental sulfur and a preliminary product stream, and then passing said preliminary product stream to the first reaction stage.

9. A process according to claim 8 in which the temperature in the preliminary reaction stage is about 700° C.

10. A process according to claim 2 in which the gas stream, the first product stream or second product stream is passed through a special reaction stage at a temperature between about 150° C. and about 350° C. in the presence of water vapor said stage containing a catalyst of the empirical formula $La_2O_2S$ to obtain a product stream having reduced content of carbonyl sulfide, and said product stream is passed to the next reaction stage.

11. A process according to claim 3 in which the temperature in the special reaction stage is between 400° C. and 700° C.

12. A multi-stage process for reducing the content of hydrogen sulfide, sulfur dioxide, carbonyl sulfide and carbon disulfide in a gas stream, which comprises (a) passing said gas stream through a first reaction stage in which (i) at least a portion of the hydrogen sulfide reacts with at least a portion of the sulfur dioxide to form elemental sulfur and water, (ii) carbonyl sulfide reacts with sulfur dioxide to form elemental sulfur and carbon dioxide, (iii) carbonyl sulfide reacts with water to form hydrogen sulfide and carbon dioxide, (iv) carbon disulfide reacts with sulfur dioxide to form elemental sulfur and carbon dioxide and (v) carbonyl sulfide reacts with water to form hydrogen sulfide and carbon dioxide, at a temperature of between about 150° and 350° C. in the presence of a pretreated catalyst of the formula $$xLn_2O_3 \cdot yT_2O_3$$

in which Ln is yttrium or a rare earth element, T is a transition element selected from the group consisting of cobalt, iron and nickel, and each of x and y independently is a number from 0 to 3, said catalyst being substantially non-crystalline and having a surface area of from about 10 m²/g to about 40 m²/g and having been prepared at a temperature no higher than 700° C., the elemental sulfur formed and obtaining a first product stream comprising gases selected from the group consisting of hydrogen sulfide and sulfur dioxide and a possible minor amount of carbonyl sulfide, (b) passing the product stream of said first stage through one or more intermediate reaction stages in which the hydrogen sulfide and sulfur dioxide catalytically react in the Claus reaction to form elemental sulfur and water, removing the elemental sulfur and obtaining a second product stream which may contain carbonyl sulfide and hydrogen sulfide, (c) passing the product stream of the intermediate stage through a final reaction stage in which hydrogen sulfide and carbonyl sulfide are each reacted with oxygen to form elemental sulfur, sulfur dioxide and/or carbon dioxide at a temperature between about 150° and 300° C., in presence of a catalyst usable in the first stage, removing any elemental sulfur formed and recycling any sulfur dioxide formed to the first or second stage.

13. A process according to claim 12 in which Ln is lanthanum.

14. A process according to claim 13 in which T is cobalt.

15. A process according to claim 14 in which each of x and y is a number from 1 to 3, including non-integers.

16. A process according to claim 15 in which, in the first stage, the amount of carbonyl sulfide is reduced to less than 100 ppm and the amount of carbon disulfide is reduced to less than 10 ppm.

17. A process according to claim 13 in which the temperature in the intermediate reaction stage is below about 130° C.

18. A process according to claim 13 in which the temperature in the final reaction stage is about 200° C.

19. A process according to claim 12 in which the gas stream contains more than about 7% of hydrogen sulfide and it is passed, prior to the first reaction stage, through a preliminary reaction stage at a temperature of between about 150° C. and about 750° C., said stage containing a catalyst usable in the first reaction stage and in which a portion of the hydrogen sulfide reacts with sulfur dioxide to form elemental sulfur and water, the elemental sulfur is removed, and a preliminary product stream containing a reduced amount of hydrogen sulfide is passed to the first reaction stage.

20. A process according to claim 19 in which the temperature in the preliminary reaction stage is about 700° C.

21. A process according to claim 19 in which the preliminary product stream contains less than 7% of hydrogen sulfide.

22. A process according to claim 13 in which the gas stream, the product stream of the first stage or a product stream of an intermediate stage is passed through a special reaction stage in which carbonyl sulfide reacts with sulfur dioxide to form carbon dioxide and elemental sulfur, at a temperature between about 150° C. and about 350° C. in the presence of water vapor and a catalyst of the empirical formula $$La_2O_2S,$$

removing the elemental sulfur formed and the product stream is passed to the next reaction stage.

23. A process according to claim 24 in which the temperature in the special reaction stage is between 400° and 700°.

24. A process according to claim 13 in which the gas stream, the product stream of the first stage or a product stream of an intermediate stage is passed through a special reaction stage in which carbonyl sulfide reacts with sulfur dioxide to form carbon dioxide and elemental sulfur, at a temperature between about 350° C. and about 700° C. in the absence of water vapor and in the presence of a catalyst of the empirical formula $$La_2O_2S$$

removing the elemental sulfur formed, and the product stream is passed to the next reaction stage.

* * * * *

UNITED STATES PATENT AND TRADEMARK OFFICE
CERTIFICATE OF CORRECTION

PATENT NO. : 4,374,819

DATED : February 22, 1983

INVENTOR(S) : Frank C. Palilla et al

It is certified that error appears in the above-identified patent and that said Letters Patent is hereby corrected as shown below:

In Claim 1, line 3 thereof before "disulfide" insert --carbon--.

In Claim 12, line 27, after "°C.," and before "the" insert --removing--.

In Claim 12, line 46, after "in" and before "presence" insert --the--.

In Claim 23, line 3 thereof after "700°" and before the period (.), insert --C--.

Signed and Sealed this

Fourteenth Day of June 1983

[SEAL]

Attest:

DONALD J. QUIGG

Attesting Officer

Acting Commissioner of Patents and Trademarks